United States Patent
Kim et al.

(10) Patent No.: US 12,035,305 B2
(45) Date of Patent: Jul. 9, 2024

(54) METHOD FOR OPERATING TERMINAL AND BASE STATION IN WIRELESS COMMUNICATION SYSTEM SUPPORTING UNLICENSED BAND, AND DEVICE FOR SUPPORTING SAME

(71) Applicant: LG Electronics Inc., Seoul (KR)

(72) Inventors: Seonwook Kim, Seoul (KR); Hanjun Park, Seoul (KR); Suckchel Yang, Seoul (KR)

(73) Assignee: LG Electronics Inc., Seoul (KR)

(*) Notice: Subject to any disclaimer, the term of this patent is extended or adjusted under 35 U.S.C. 154(b) by 716 days.

(21) Appl. No.: 17/267,456

(22) PCT Filed: Aug. 9, 2019

(86) PCT No.: PCT/KR2019/010166
§ 371 (c)(1),
(2) Date: Feb. 9, 2021

(87) PCT Pub. No.: WO2020/032747
PCT Pub. Date: Feb. 13, 2020

(65) Prior Publication Data
US 2021/0329671 A1    Oct. 21, 2021

Related U.S. Application Data

(60) Provisional application No. 62/716,915, filed on Aug. 9, 2018.

(51) Int. Cl.
*H04W 16/14* (2009.01)
*H04W 72/0453* (2023.01)
*H04W 72/1268* (2023.01)

(52) U.S. Cl.
CPC ....... *H04W 72/1268* (2013.01); *H04W 16/14* (2013.01); *H04W 72/0453* (2013.01)

(58) Field of Classification Search
CPC .................. H04W 72/1268; H04W 16/14
(Continued)

(56) References Cited

U.S. PATENT DOCUMENTS

2018/0368175 A1* 12/2018 Jeon ................. H04W 72/04

FOREIGN PATENT DOCUMENTS

WO    WO2017164664    9/2017
WO    WO2018026182    2/2018

OTHER PUBLICATIONS

CATR, "Frame structure design in NR-U," R1-1807204, 3GPP TSG RAN WG1 Meeting #93, Busan, Korea, dated May 21-25, 2018, 5 pages.
(Continued)

*Primary Examiner* — Angel T Brockman
(74) *Attorney, Agent, or Firm* — Fish & Richardson P.C.

(57) ABSTRACT

Disclosed are a method for operating a terminal and a base station in a wireless communication system supporting an unlicensed band, and a device for supporting same. More specifically, one embodiment of the present disclosure discloses a method comprising receiving first control information including information about at least one sub transmission band of a full transmission band, receiving second control information including information about at least one interlace from among a plurality of interlaces, and transmitting an uplink signal in a resource determined on the basis of the first control information and the second control information, and a device for supporting same.

16 Claims, 21 Drawing Sheets

(58) Field of Classification Search
USPC ........................................................ 370/329
See application file for complete search history.

(56) References Cited

OTHER PUBLICATIONS

Huawei, HiSilicon, "UL PHY channels for NR unlicensed," R1-1805921, 3GPP TSG RAN WG1 Meeting #93, Busan, Korea, dated May 21-25, 2018, 11 pages.
PCT International Search Report and Written Opinion in International Appln. No. PCT/KR2019/010166, dated Dec. 2, 2019, 18 pages (with English translation).
Samsung, "Uplink signal and channel design for NR-U," R1-1806760, 3GPP TSG RAN WG1 Meeting #93, Busan, Korea, dated May 21-25, 2018, 7 pages.

* cited by examiner

FIG. 13
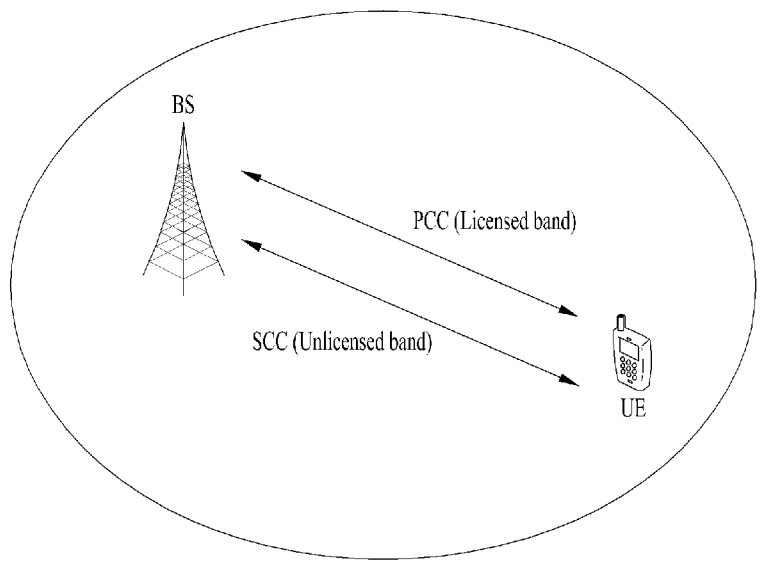
(a) Carrier aggregation between L-band and U-band
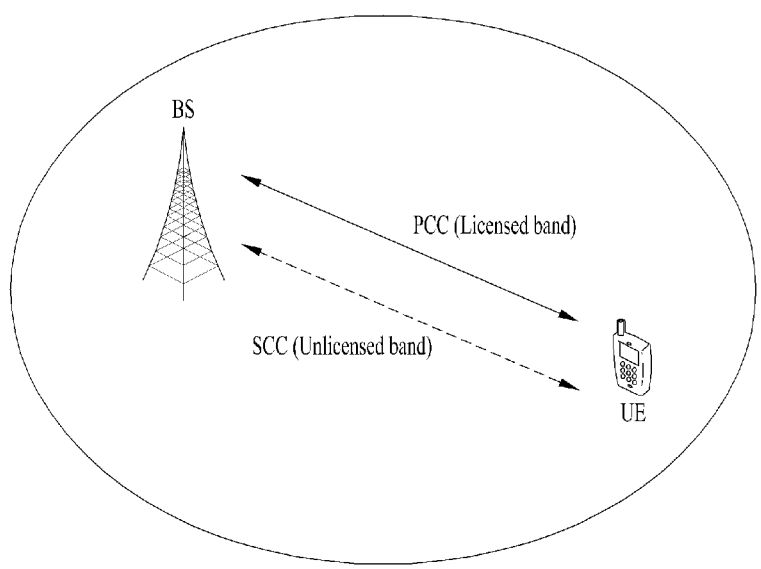
(b) Standalone U-band(s)

METHOD FOR OPERATING TERMINAL AND BASE STATION IN WIRELESS COMMUNICATION SYSTEM SUPPORTING UNLICENSED BAND, AND DEVICE FOR SUPPORTING SAME

CROSS-REFERENCE TO RELATED APPLICATIONS

This application is a National Stage application under 35 U.S.C. § 371 of International Application No. PCT/KR2019/010166, filed on Aug. 9, 2019, which claims the benefit of U.S. Provisional Application No. 62/716,915, filed on Aug. 9, 2018. The disclosures of the prior applications are incorporated by reference in their entirety.

TECHNICAL FIELD

The present disclosure relates to a wireless communication system, and more particularly to a method for operating a user equipment (UE) and a base station (BS) in a wireless communication system, and a device for supporting the same.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has been considered in the next generation communication system. Moreover, a communication system design capable of supporting services/UEs sensitive to reliability and latency has been discussed.

DISCLOSURE

Technical Problem

An object of the present disclosure is to provide a method for operating a user equipment (UE) and a base station (BS) in a wireless communication system supporting an unlicensed band, and devices for supporting the same.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solutions

The present disclosure provides a method for operating a user equipment (UE) and a base station (BS) in a wireless communication system supporting an unlicensed band, and devices for supporting the same.

In accordance with one aspect of the present disclosure, a method for transmitting an uplink (UL) signal to a base station (BS) by a user equipment (UE) in a wireless communication system supporting an unlicensed band may include receiving first control information including information about at least one sub-band from among a total transmission band configured for the user equipment (UE) in the unlicensed band, wherein the total transmission band includes a plurality of interlaces and each interlace includes a plurality of resource blocks (RBs) having a predefined interval therebetween within the total transmission band, receiving second control information including information about at least one interlace from among the plurality of interlaces, and transmitting, according to a channel access procedure, the uplink (UL) signal using resources that are determined based on the first control information and the second control information.

Each of the at least one sub-band may be configured to have the same size as a basic unit for the channel access procedure.

The resources determined based on the first control information and the second control information may include the at least one interlace used in the at least one sub-band.

The total transmission band may be indicated through system information or higher layer signaling.

The first control information may be received through higher layer signaling or downlink control information (DCI).

The first control information may include a first resource indication value (RIV) that indicates a start point of the at least one sub-band and a length of the at least one sub-band.

The first control information may include bitmap information indicating the at least one sub-band.

The second control information may be received through downlink control information (DCI).

The second control information may include a second resource indication value (RIV) that indicates a start point of the at least one interlace and a length of the at least one interlace.

The second control information may include bitmap information indicating the at least one interlace.

Each of the plurality of resource blocks (RBs) may include 12 subcarriers. If the subcarriers are spaced apart from each other at intervals of 15 kHz, the predefined interval may be set to 10 resource blocks (RBs).

Each of the plurality of resource blocks (RBs) may include 12 subcarriers. If the subcarriers are spaced apart from each other at intervals of 30 kHz, the predefined interval may be set to 5 resource blocks (RBs).

Each of the plurality of resource blocks (RBs) may include 12 subcarriers. If the subcarriers are spaced apart from each other at intervals of 60 kHz, the predefined interval may be set to 2.5 resource blocks (RBs), 3 resource blocks (RBs), or 5 resource blocks (RBs).

In accordance with another aspect of the present disclosure, a user equipment (UE) for operating in a wireless communication system supporting an unlicensed band may include at least one radio frequency (RF) module, at least one processor, and at least one memory operably connected to the at least one processor, and configured to store instructions so that execution of the instructions enables the at least one processor to perform a specific operation. The specific operation includes receiving first control information including information about at least one sub-band from among a total transmission band configured for the user equipment (UE) in the unlicensed band, wherein the total transmission band includes a plurality of interlaces and each interlace includes a plurality of resource blocks (RBs) having a predefined interval therebetween within the total transmission band, receiving second control information including information about at least one interlace from among the plurality of interlaces, and transmitting, according to a channel access procedure, an uplink (UL) signal using resources that are determined based on the first control information and the second control information.

The user equipment (UE) may communicate with at least one of a mobile terminal, a network, and an autonomous driving vehicle other than a vehicle equipped with the UE.

In accordance with another aspect of the present disclosure, a method for receiving an uplink (UL) signal from a user equipment (UE) by a base station (BS) in a wireless communication system supporting an unlicensed band may include transmitting, to the user equipment (UE), first control information including information about at least one sub-band from among a total transmission band configured for the user equipment (UE) in the unlicensed band, wherein the total transmission band includes a plurality of interlaces and each interlace includes a plurality of resource blocks (RBs) having a predefined interval therebetween within the total transmission band, transmitting second control information including information about at least one interlace from among the plurality of interlaces, and receiving the uplink (UL) signal using resources that are determined based on the first control information and the second control information.

The above aspects of the present disclosure are just parts of preferred embodiments of the present disclosure, and various embodiments reflecting the technical features of the present disclosure can be derived and understood from the following description by those having ordinary skill in the technical field to which the present disclosure pertains.

Advantageous Effects

As is apparent from the above description, the embodiments of the present disclosure have the following effects.

In accordance with the embodiments of the present disclosure, a user equipment (UE) can receive only a sub-band from among the entire transmission band available for uplink (UL) signal transmission, or can receive the entire transmission band, such that the user equipment (UE) can perform uplink (UL) signal transmission using the received band.

Therefore, the user equipment (UE) can efficiently use radio resources according to various situations.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DESCRIPTION OF DRAWINGS

The accompanying drawings, which are included to provide a further understanding of the disclosure, provide embodiments of the present disclosure together with detail explanation. Yet, a technical characteristic of the present disclosure is not limited to a specific drawing. Characteristics disclosed in each of the drawings are combined with each other to configure a new embodiment. Reference numerals in each drawing correspond to structural elements.

FIG. 13 is a diagram illustrating a wireless communication system supporting an unlicensed band according to embodiments of the present disclosure.

BEST MODE

Figure 1:
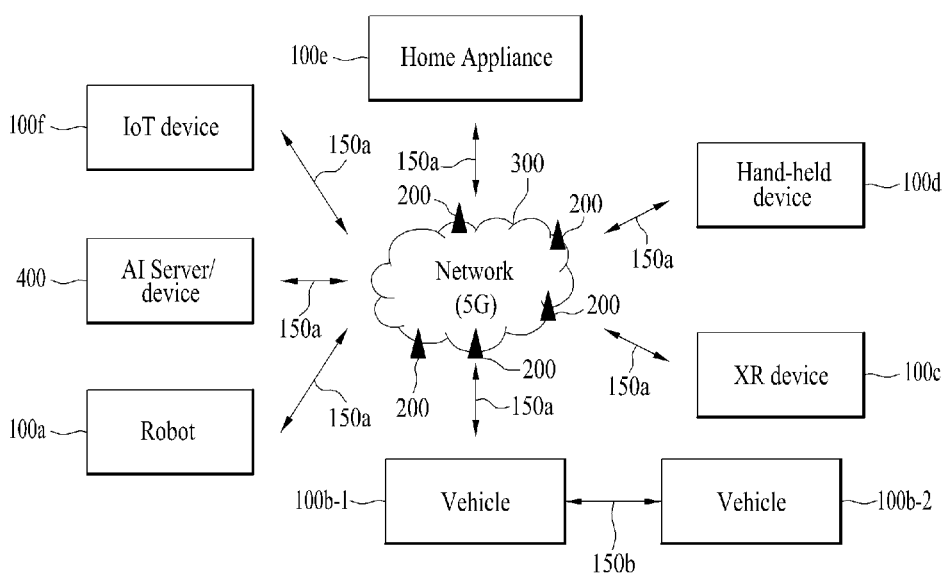
FIG. 1 is a diagram illustrating a communication system according to embodiments of the present disclosure.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a base station (BS) and a user equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), gNode B (gNB), an advanced base station (ABS), an access point, etc.

In the embodiments of the present disclosure, the term terminal may be replaced with a UE, a mobile station (MS), a subscriber station (SS), a mobile subscriber station (MSS), a mobile terminal, an advanced mobile station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an uplink (UL). Likewise, the UE may serve as a reception end and the BS may serve as a transmission end, on a downlink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, 3GPP 5G NR system and a 3GPP2 system. In particular, the embodiments of the present disclosure may be supported by the standard specifications, 3GPP TS 36.211, 3GPP TS 36.212, 3GPP TS 36.213, 3GPP TS 36.321, 3GPP TS 36.331, 3GPP TS 37.213, 3GPP TS 38.211, 3GPP TS 38.212, 3GPP TS 38.213, 3GPP TS 38.321 and 3GPP TS 38.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

Hereinafter, 3GPP LTE/LTE-A systems and 3GPP NR system are explained, which are examples of wireless access systems.

The embodiments of the present disclosure can be applied to various wireless access systems such as code division multiple access (CDMA), frequency division multiple access (FDMA), time division multiple access (TDMA), orthogonal frequency division multiple access (OFDMA), single carrier frequency division multiple access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE.

While the embodiments of the present disclosure are described in the context of 3GPP LTE/LTE-A systems and 3GPP NR system in order to clarify the technical features of the present disclosure, the present disclosure is also applicable to an IEEE 802.16e/m system, etc.

1. Various Examples of the Present Disclosure 1.1. Example of Communication System to which the Present Disclosure Applies The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

FIG. 1 illustrates a communication system 1 applied to the present disclosure.

Referring to FIG. 1, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

1.2. Example of Wireless Device to which the Present Disclosure Applies

Figure 2:
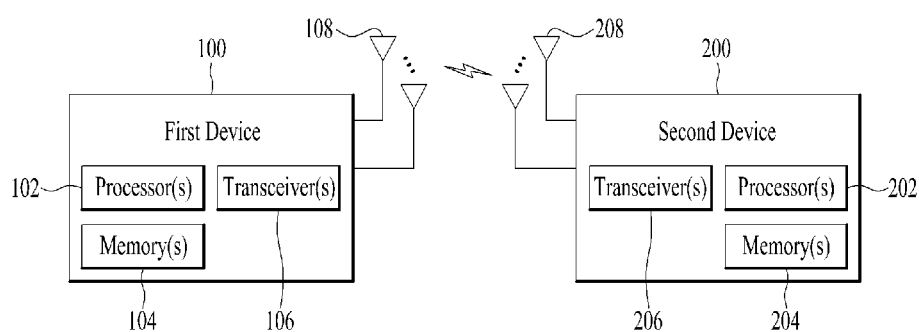
FIG. 2 is a diagram illustrating one example of a wireless device according to embodiments of the present disclosure.

FIG. 2 illustrates wireless devices applicable to the present disclosure.

Referring to FIG. 2, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 3:
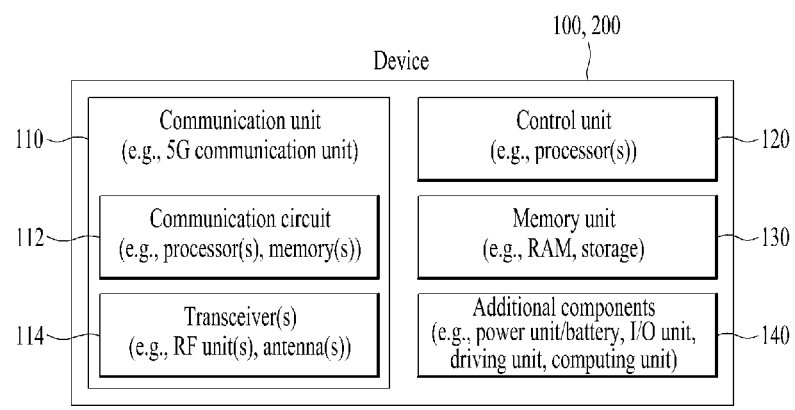
FIG. 3 is a diagram illustrating another example of a wireless device according to embodiments of the present disclosure.

1.3. Usage Example of Wireless Device to which the Present Disclosure Applies FIG. 3 illustrates another example of a wireless device applied to the present disclosure. The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 2. For example, the transceiver(s) 114 may include the one or more transceivers 106 and 206 and/or the one or more antennas 108 and 208 of FIG. 2. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a fintech device (or a finance device), a security device, a climate/environment device, the AI server/device (400 of FIG. 1), the BSs (200 of FIG. 1), a network node, etc. The wireless device may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 3 will be described in detail with reference to the drawings.

1.4. Example of Mobile Device to which the Present Disclosure Applies

Figure 4:
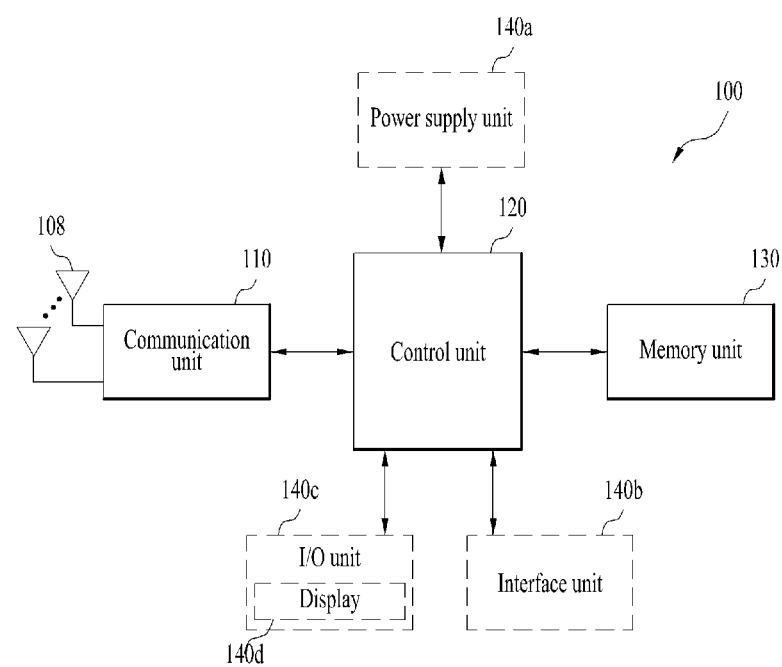
FIG. 4 is a diagram illustrating a hand-held device according to embodiments of the present disclosure.

FIG. 4 illustrates a hand-held device applied to the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 4, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 3, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 5:
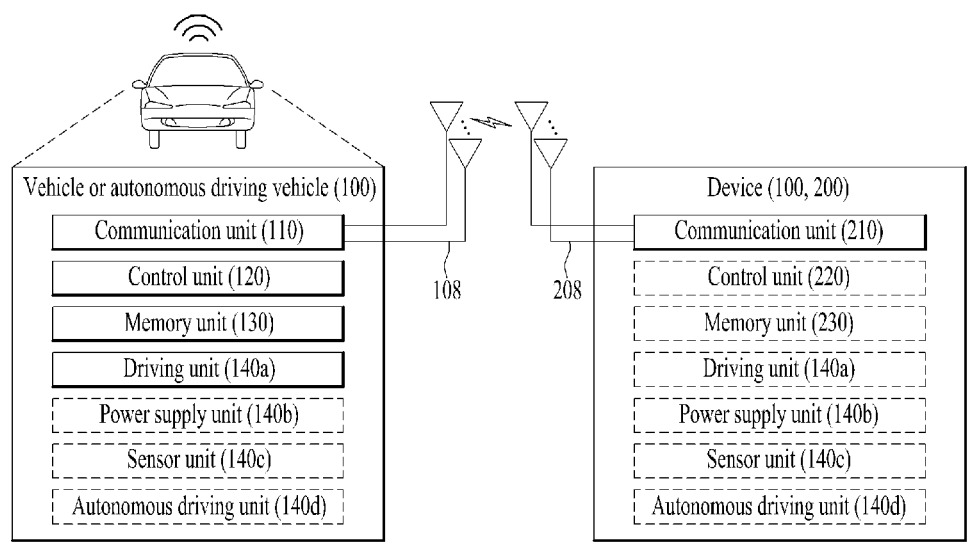
FIG. 5 is a diagram illustrating a vehicle or an autonomous driving vehicle according to embodiments of the present disclosure.

1.5. Examples of Vehicle or Autonomous Vehicle to Which the Present Disclosure Applies FIG. 5 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 5, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 3, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

2. Overview of 3GPP System

2.1. Physical Channels and General Signal Transmission

In a wireless access system, a UE receives information from a base station on a DL and transmits information to the base station on a UL. The information transmitted and received between the UE and the base station includes general data information and various types of control information. There are many physical channels according to the types/usages of information transmitted and received between the base station and the UE.

Figure 6:
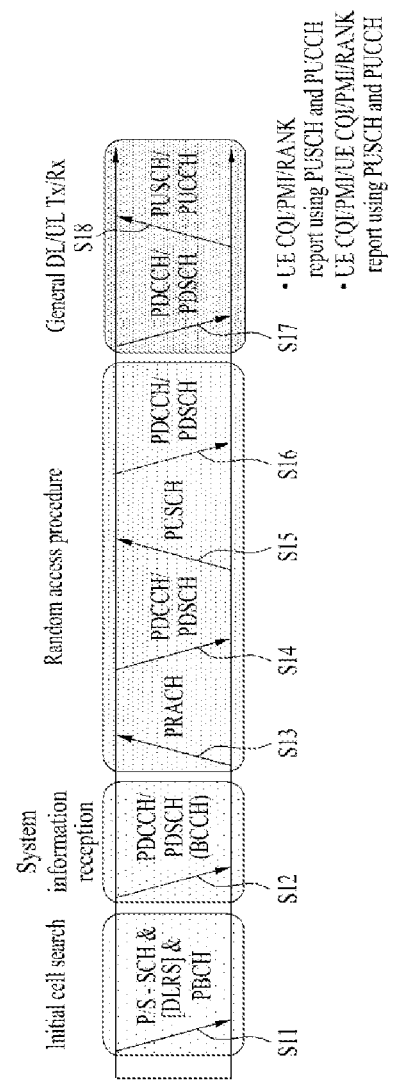
FIG. 6 is a diagram illustrating physical channels and a signal transmission method using the physical channels according to embodiments of the present disclosure.

FIG. 6 illustrates physical channels and a general signal transmission method using the physical channels, which may be used in embodiments of the present disclosure.

When a UE is powered on or enters a new cell, the UE performs initial cell search (S11). The initial cell search involves acquisition of synchronization to a BS. Specifically, the UE synchronizes its timing to the base station and acquires information such as a cell identifier (ID) by receiving a primary synchronization channel (P-SCH) and a secondary synchronization channel (S-SCH) from the BS.

Then the UE may acquire information broadcast in the cell by receiving a physical broadcast channel (PBCH) from the base station.

During the initial cell search, the UE may monitor a DL channel state by receiving a Downlink Reference Signal (DL RS).

After the initial cell search, the UE may acquire more detailed system information by receiving a physical downlink control channel (PDCCH) and receiving on a physical downlink shared channel (PDSCH) based on information of the PDCCH (S12).

Subsequently, to complete connection to the eNB, the UE may perform a random access procedure with the eNB (S13 to S16). In the random access procedure, the UE may transmit a preamble on a physical random access channel (PRACH) (S13) and may receive a PDCCH and a random access response (RAR) for the preamble on a PDSCH associated with the PDCCH (S14). The UE may transmit a PUSCH by using scheduling information in the RAR (S15), and perform a contention resolution procedure including reception of a PDCCH signal and a PDSCH signal corresponding to the PDCCH signal (S16).

After the above procedure, the UE may receive a PDCCH and/or a PDSCH from the BS (S17) and transmit a physical uplink shared channel (PUSCH) and/or a physical uplink control channel (PUCCH) to the BS (S18), in a general UL/DL signal transmission procedure.

Control information that the UE transmits to the BS is generically called uplink control information (UCI). The UCI includes a hybrid automatic repeat and request acknowledgement/negative acknowledgement (HARQ-ACK/NACK), a scheduling request (SR), a channel quality indicator (CQI), a precoding matrix index (PMI), a rank indicator (RI), etc.

In general, UCI is transmitted periodically on a PUCCH. However, if control information and traffic data should be transmitted simultaneously, the control information and traffic data may be transmitted on a PUSCH. In addition, the UCI may be transmitted aperiodically on the PUSCH, upon receipt of a request/command from a network.

2.2. Synchronization Signal Block (SSB) or SS/PBCH Block

In the NR system to which the present disclosure is applicable, a primary synchronization signal (PSS), a secondary synchronization signal (SSS), and/or a physical broadcast signal (PBCH) may be transmitted in one SS block or SS PBCH block (hereinafter, referred to as an SSB or SS/PBCH block). Multiplexing other signals may not be precluded within a 'SS block'.

The SS/PBCH block may be transmitted in a band other than the center of a system band. Particularly, when the BS supports broadband operation, the BS may transmit multiple SS/PBCH blocks.

Figure 7:
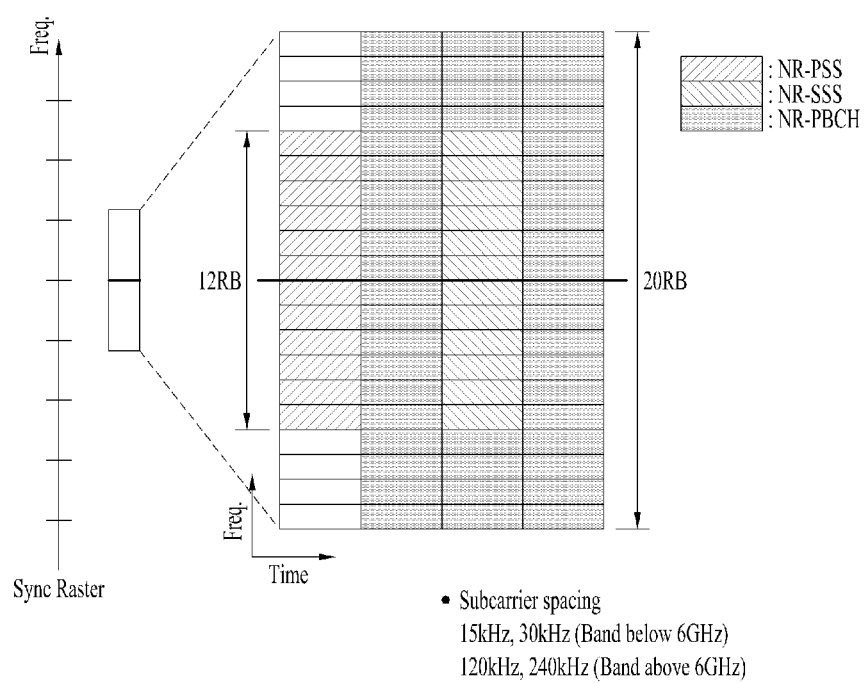
FIG. 7 is a diagram illustrating an example of SS/PBCH blocks according to embodiments of the present disclosure.

FIG. 7 is a schematic diagram illustrating an SS/PBCH block applicable to the present disclosure.

As illustrated in FIG. 7, the SS/PBCH block applicable to the present disclosure may include 20 RBs in four consecutive OFDM symbols. Further, the SS/PBCH block may include a PSS, an SSS, and a PBCH, and the UE may perform cell search, system information acquisition, beam alignment for initial access, DL measurement, and so on based on the SS/PBCH block.

Each of the PSS and the SSS includes one OFDM symbol by 127 subcarriers, and the PBCH includes three OFDM symbols by 576 subcarriers. Polar coding and QPSK are applied to the PBCH. The PBCH includes data REs and DMRS REs in every OFDM symbol. There are three DMRS REs per RB, with three data REs between every two adjacent DMRS REs.

Further, the SS/PBCH block may be transmitted even in a frequency band other than the center frequency of a frequency band used by the network.

For this purpose, a synchronization raster being candidate frequency positions at which the UE should detect the SS/PBCH block is defined in the NR system to which the present disclosure is applicable. The synchronization raster may be distinguished from a channel raster.

In the absence of explicit signaling of the position of the SS/PBCH block, the synchronization raster may indicate available frequency positions for the SS/PBCH block, at which the UE may acquire system information.

The synchronization raster may be determined based on a global synchronization channel number (GSCN). The GSCN may be transmitted by RRC signaling (e.g., an MIB, a system information block (SIB), remaining minimum system information (RMSI), other system information (OSI), or the like).

The synchronization raster is defined to be longer along the frequency axis than the channel raster and characterized by a smaller number of blind detections than the channel raster, in consideration of the complexity of initial synchronization and a detection speed.

Figure 8:
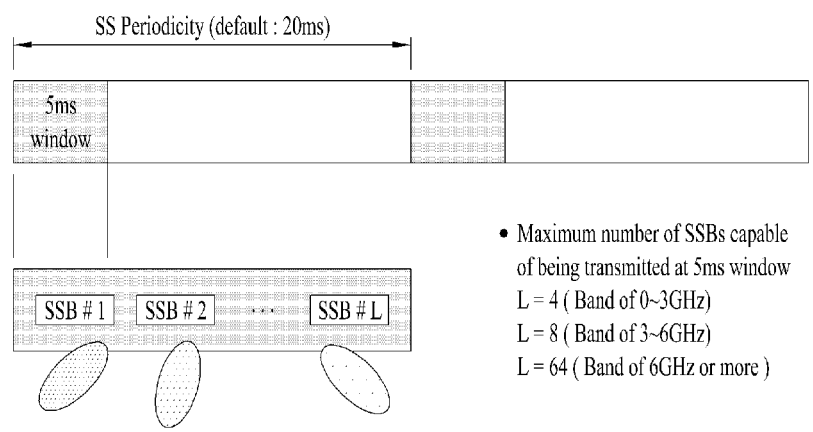
FIG. 8 is a conceptual diagram illustrating an example of a method for transmitting SS/PBCH blocks according to embodiments of the present disclosure.

FIG. 8 is a schematic diagram illustrating an SS/PBCH block transmission structure applicable to the present disclosure.

In the NR system to which the present disclosure is applicable, the BS may transmit an SS/PBCH block up to 64 times for 5 ms. The multiple SS/PBCH blocks may be transmitted on different beams, and the UE may detect the SS/PBCH block on the assumption that the SS/PBCH block is transmitted on a specific one beam every 20 ms.

As the frequency band is higher, the BS may set a larger maximum number of beams available for SS/PBCH block transmission within 5 ms. For example, the BS may transmit the SS/PBCH block by using up to 4 different beams at or below 3 GHz, up to 8 different beams at 3 to 6 GHz, and up to 64 different beams at or above 6 GHz, for 5 ms.

1.5. Synchronization Procedure

The UE may acquire synchronization by receiving the above-described SS/PBCH block from the BS. The synchronization procedure largely includes cell ID detection and timing detection. The cell ID detection may include PSS-based cell ID detection and SSS-based cell ID detection. The timing detection may include PBCH DMRS-based timing detection and PBCH contents-based (e.g., MIB-based) timing detection.

First, the UE may acquire timing synchronization and the physical cell ID of a detected cell by detecting a PSS and an SSS. More specifically, the UE may acquire the symbol timing of the SS block and detect a cell ID within a cell ID group, by PSS detection. Subsequently, the UE detects the cell ID group by SSS detection.

Further, the UE may detect the time index (e.g., slot boundary) of the SS block by the DMRS of the PBCH. The UE may then acquire half-frame boundary information and system frame number (SFN) information from an MIB included in the PBCH.

The PBCH may indicate that a related (or corresponding) RMSI PDCCH/PDSCH is transmitted in the same band as or a different band from that of the SS/PBCH block. Accordingly, the UE may then receive RMSI (e.g., system information other than the MIB) in a frequency band indicated by the PBCH or a frequency band carrying the PBCH, after decoding of the PBCH.

In relation to the operation, the UE may acquire system information.

The MIB includes information/parameters required for monitoring a PDCCH that schedules a PDSCH carrying SystemInformationBlock1 (SIB1), and is transmitted to the UE on the PBCH in the SS/PBCH block by the gNB.

The UE may check whether there is a CORESET for a Type0-PDCCH common search space, based on the MIB. The Type0-PDCCH common search space is a kind of PDCCH search space and used to transmit a PDCCH that schedules an SI message.

In the presence of a Type0-PDCCH common search space, the UE may determine (i) a plurality of contiguous RBs included in the CORESET and one or more consecutive symbols and (ii) a PDCCH occasion (e.g., a time-domain position for PDCCH reception), based on information (e.g., pdcch-ConfigSIB1) included in the MIB.

In the absence of a Type0-PDCCH common search space, pdcch-ConfigSIB1 provides information about a frequency position at which the SSB/SIB1 exists and a frequency range in which the SSB/SIB1 does not exist.

SIB1 includes information about the availability and scheduling of the other SIBs (hereinafter, referred to as SIBx where x is 2 or a larger integer). For example, SIB1 may indicate whether SIBx is periodically broadcast or provided in an on-demand manner (or upon request of the UE). When SIBx is provided in the on-demand manner, SIB1 may include information required for an SI request of the UE. SIB1 is transmitted on a PDSCH. A PDCCH that schedules SIB1 is transmitted in a Type0-PDCCH common search space, and SIB1 is transmitted on a PDSCH indicated by the PDCCH.

2.4. Radio Frame Structures

Figure 9:
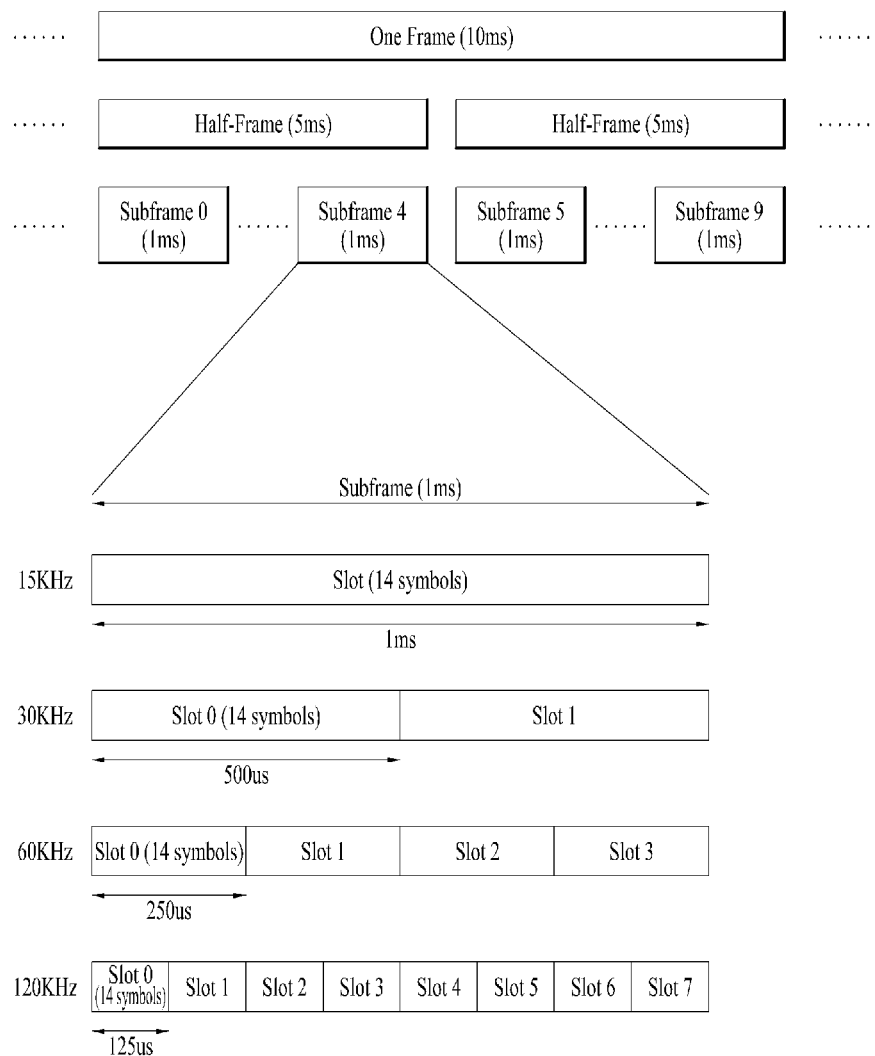
FIG. 9 is a diagram illustrating a radio frame structure based on an NR system according to embodiments of the present disclosure.

FIG. 9 is a diagram illustrating a radio frame structure in an NR system to which embodiments of the present disclosure are applicable.

In the NR system, UL and DL transmissions are based on a frame as illustrated in FIG. 9. One radio frame is 10 ms in duration, defined by two 5-ms half-frames. One half-frame is defined by five 1-ms subframes. One subframe is divided into one or more slots, and the number of slots in a subframe depends on an SCS. Each slot includes 12 or 14 OFDM(A) symbols according to a CP. Each slot includes 14 symbols in a normal CP case, and 12 symbols in an extended CP case. Herein, a symbol may include an OFDM symbol (or a CP-OFDM) symbol and an SC-FDMA symbol (or a DFT-s-OFDM symbol).

Table 1 lists the number of symbols per slot, the number of slots per frame, and the number of slots per subframe in the normal CP case, and Table 2 lists the number of symbols per slot, the number of slots per frame, and the number of slots per subframe in the extended CP case.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

TABLE 2

| μ | $N_{symb}^{slot}$ | $N_{slot}^{frame,\mu}$ | $N_{slot}^{subframe,\mu}$ |
|---|---|---|---|
| 2 | 12 | 40 | 4 |

In the above tables, $N^{slot}_{symb}$ represents the number of symbols in a slot, $N^{frame,\mu}_{slot}$ represents the number of slots in a frame, and $N^{subframe,\mu}_{slot}$ represents the number of slots in a subframe.

In the NR system to which the present disclosure is applicable, different OFDM(A) numerologies (e.g., SCSs, CP length, and so on) may be configured for a plurality of cells aggregated for a UE. Therefore, the (absolute) duration of a time resource (e.g., an SF, slot, or TTI) (for the convenience of description, generically referred to as a time unit (TU)) including the same number of symbols may be different between the aggregated cells.

Figure 10:
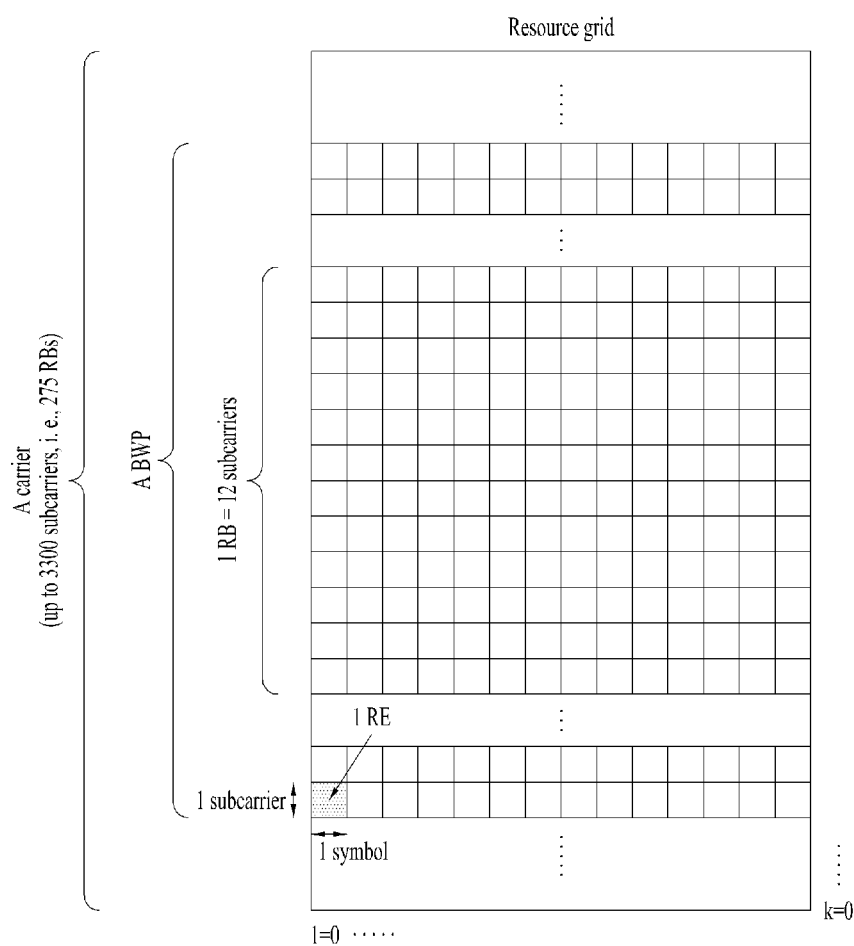
FIG. 10 is a diagram illustrating an example of a slot structure based on an NR system according to embodiments of the present disclosure.

FIG. 10 is a diagram illustrating a slot structure in an NR system to which embodiments of the present disclosure are applicable.

One slot includes a plurality of symbols in the time domain. For example, one slot includes 7 symbols in a normal CP case and 6 symbols in an extended CP case.

A carrier includes a plurality of subcarriers in the frequency domain. An RB is defined by a plurality of (e.g., 12) consecutive subcarriers in the frequency domain.

A bandwidth part (BWP), which is defined by a plurality of consecutive (P)RBs in the frequency domain, may correspond to one numerology (e.g., SCS, CP length, and so on).

A carrier may include up to N (e.g., 5) BWPs. Data communication may be conducted in an activated BWP, and only one BWP may be activated for one UE. In a resource grid, each element is referred to as an RE, to which one complex symbol may be mapped.

Figure 11:
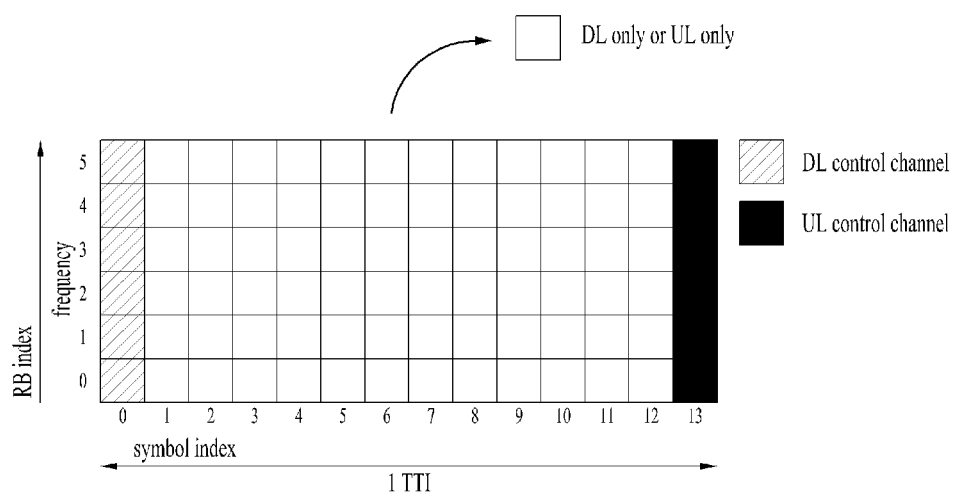
FIG. 11 is a diagram illustrating a self-contained slot structure based on an NR system according to embodiments of the present disclosure.

FIG. 11 is a diagram illustrating a self-contained slot structures in an NR system to which embodiments of the present disclosure are applicable.

In FIG. 11, the hatched area (e.g., symbol index=0) indicates a DL control region, and the black area (e.g., symbol index=13) indicates a UL control region. The remaining area (e.g., symbol index=1 to 12) may be used for DL or UL data transmission.

Based on this structure, an eNB and a UE may sequentially perform DL transmission and UL transmission in one slot. That is, the eNB and UE may transmit and receive not only DL data but also a UL ACK/NACK for the DL data in one slot. Consequently, this structure may reduce a time required until data retransmission when a data transmission error occurs, thereby minimizing the latency of a final data transmission.

In this self-contained slot structure, a predetermined length of time gap is required to allow the eNB and UE to switch from transmission mode to reception mode and vice versa. To this end, in the self-contained slot structure, some OFDM symbols at the time of switching from DL to UL may be configured as a guard period (GP).

Although it has been described above that the self-contained slot structure includes both DL and UL control regions, these control regions may be selectively included in the self-contained slot structure. In other words, the self-contained slot structure according to the present disclosure may include either the DL control region or the UL control region as well as both the DL and UL control regions as illustrated in FIG. 11.

Further, the order of the regions in one slot may vary according to embodiments. For example, one slot may be configured in the order of DL control region, DL data region, UL control region, and UL data region, or UL control region, UL data region, DL control region, and DL data region.

A PDCCH may be transmitted in the DL control region, and a PDSCH may be transmitted in the DL data region. A PUCCH may be transmitted in the UL control region, and a PUSCH may be transmitted in the UL data region.

The PDCCH may deliver downlink control information (DCI), for example, DL data scheduling information, UL data scheduling information, and so on. The PUCCH may deliver uplink control information (UCI), for example, an ACK/NACK for DL data, channel state information (CSI), a scheduling request (SR), and so on.

The PDSCH conveys DL data (e.g., DL-shared channel transport block (DL-SCH TB)) and uses a modulation scheme such as quadrature phase shift keying (QPSK), 16-ary quadrature amplitude modulation (16QAM), 64QAM, or 256QAM. A TB is encoded into a codeword. The PDSCH may deliver up to two codewords. Scrambling and modulation mapping are performed on a codeword basis, and modulation symbols generated from each codeword are mapped to one or more layers (layer mapping). Each layer together with a demodulation reference signal (DMRS) is mapped to resources, generated as an OFDM symbol signal, and transmitted through a corresponding antenna port.

The PDCCH carries DCI and uses QPSK as a modulation scheme. One PDCCH includes 1, 2, 4, 8, or 16 control channel elements (CCEs) according to an aggregation level (AL). One CCE includes 6 resource element groups (REGs). One REG is defined by one OFDM symbol by one (P)RB.

Figure 12:
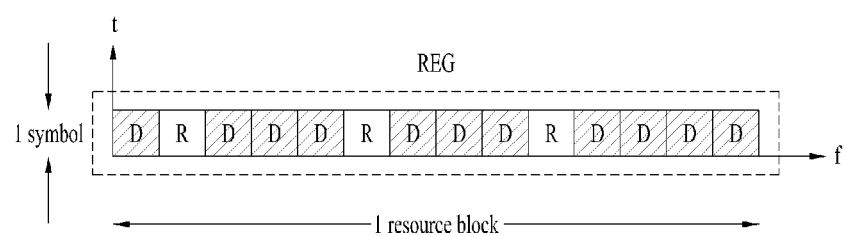
FIG. 12 is a diagram illustrating one resource element group (REG) structure based on an NR system according to embodiments of the present disclosure.

FIG. 12 is a diagram illustrating the structure of one REG in an NR system to which embodiments of the present disclosure are applicable.

In FIG. 12, D represents an RE to which DCI is mapped, and R represents an RE to which a DMRS is mapped. The DMRS is mapped to REs #1, #5, and #9 along the frequency axis in one symbol The PDCCH is transmitted in a control resource set (CORESET). A CORESET is defined as a set of REGs having a given numerology (e.g., SCS, CP length, and so on). A plurality of CORESETs for one UE may overlap with each other in the time/frequency domain. A CORESET may be configured by system information (e.g., a master information block (MIB)) or by UE-specific higher layer (RRC) signaling. Specifically, the number of RBs and the number of symbols (up to 3 symbols) included in a CORESET may be configured by higher-layer signaling.

The PUSCH delivers UL data (e.g., UL-shared channel transport block (UL-SCH TB)) and/or UCI based on a CP-OFDM waveform or a DFT-s-OFDM waveform. When the PUSCH is transmitted in the DFT-s-OFDM waveform, the UE transmits the PUSCH by transform precoding. For example, when transform precoding is impossible (e.g., disabled), the UE may transmit the PUSCH in the CP- OFDM waveform, while when transform precoding is possible (e.g., enabled), the UE may transmit the PUSC in the CP-OFDM or DFT-s-OFDM waveform. A PUSCH transmission may be dynamically scheduled by a UL grant in DCI, or semi-statically scheduled by higher-layer (e.g., RRC) signaling (and/or layer 1 (L1) signaling such as a PDCCH) (configured grant). The PUSCH transmission may be performed in a codebook-based or non-codebook-based manner.

The PUCCH delivers UCI, an HARQ-ACK, and/or an SR and is classified as a short PUCCH or a long PUCCH according to the transmission duration of the PUCCH. Table 3 lists exemplary PUCCH formats.

TABLE 3

| PUCCH format | Length in OFDM symbols $N_{symb}^{PUCCH}$ | Number of bits | Usage | Etc |
|---|---|---|---|---|
| 0 | 1-2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

PUCCH format 0 conveys UCI of up to 2 bits and is mapped in a sequence-based manner, for transmission. Specifically, the UE transmits specific UCI to the eNB by transmitting one of a plurality of sequences on a PUCCH of PUCCH format 0. Only when the UE transmits a positive SR, the UE transmits the PUCCH of PUCCH format 0 in a PUCCH resource for a corresponding SR configuration.

PUCCH format 1 conveys UCI of up to 2 bits and modulation symbols of the UCI are spread with an OCC (which is configured differently whether frequency hopping is performed) in the time domain. The DMRS is transmitted in a symbol in which a modulation symbol is not transmitted (i.e., transmitted in time division multiplexing (TDM)).

PUCCH format 2 conveys UCI of more than 2 bits and modulation symbols of the DCI are transmitted in frequency division multiplexing (FDM) with the DMRS. The DMRS is located in symbols #1, #4, #7, and #10 of a given RB with a density of ⅓. A pseudo noise (PN) sequence is used for a DMRS sequence. For 1-symbol PUCCH format 2, frequency hopping may be activated.

PUCCH format 3 does not support UE multiplexing in the same PRBS, and conveys UCI of more than 2 bits. In other words, PUCCH resources of PUCCH format 3 do not include an OCC. Modulation symbols are transmitted in TDM with the DMRS.

PUCCH format 4 supports multiplexing of up to 4 UEs in the same PRBS, and conveys UCI of more than 2 bits. In other words, PUCCH resources of PUCCH format 3 includes an OCC. Modulation symbols are transmitted in TDM with the DMRS.

2.5. Bandwidth Part (BWP)

In the NR system to which the present disclosure is applicable, frequency resources of up to 400 MHz per component carrier (CC) may be allocated/supported. When a UE operating in such a wideband CC always operates with a radio frequency (RF) module for the entire CCs turned on, battery consumption of the UE may increase.

Alternatively, considering various use cases (e.g., enhanced mobile broadband (eMBB), ultra-reliable and low latency communication (URLLC), and massive machine type communication (mMTC), and so on) operating within a single wideband CC, a different numerology (e.g., SCS) may be supported for each frequency band within the CC.

Alternatively, the maximum bandwidth capability may be different for each UE.

In consideration of the above situation, the BS may indicate/configure the UE to operate only in a partial bandwidth instead of the entire bandwidth of the wideband CC. The partial bandwidth may be defined as a BWP.

A BWP may include contiguous RBs on the frequency axis, and one BWP may correspond to one numerology (e.g., SCS, CP length, slot/mini-slot duration, and so on).

The BS may configure a plurality of BWPs in one CC configured for the UE. For example, the BS may configure a BWP occupying a relatively small frequency area in a PDCCH monitoring slot, and schedule a PDSCH indicated by the PDCCH (or a PDSCH scheduled by the PDCCH) in a larger BWP. Alternatively, when UEs are concentrated on a specific BWP, the BS may configure another BWP for some of the UEs, for load balancing. Alternatively, the BS may exclude some spectrum of the entire bandwidth and configure both of the BWPs in the same slot in consideration of frequency-domain inter-cell interference cancellation between neighboring cells.

The BS may configure at least one DL/UL BWP for a UE associated with the wideband CC, and activate at least one of DL/UL BWPs configured at a specific time point (by L1 signaling (e.g., DCI or the like), MAC signaling, RRC signaling, or the like). The activated DL/UL BWP may be referred to as an active DL/UL BWP. During initial access or before an RRC connection setup, the UE may not receive a configuration for a DL/UL BWP from the BS. A DL/UL BWP assumed for the UE is defined as an initial active DL/UL BWP.

In more detail, the UE according to the present disclosure can perform the following bandwidth part (BWP) operation.

In the user equipment (UE) configured to operate in bandwidth parts (BWPs) of a serving cell, a maximum of four DL BWPs is configured in a DL bandwidth of the serving cell by higher layer parameters (e.g., DL-BWP or BWP-Downlink), and a maximum of four DL BWPs is configured in a UL bandwidth of the serving cell by higher layer parameters (e.g., UL-BWP or BWP-Uplink).

If the UE does not receive the higher layer parameter (initialDownlinkBWP), an initial active DL BWP is defined by the positions of consecutive PRBs and the number of consecutive PRBs. In this case, the consecutive PRBs may be PRBs starting from a PRB having the smallest index to a PRB having the highest index from among PRBs contained in a control resource set (CORESET) for a Type-0 PDCCH Common Search Space (CSS) set. In addition, the initial active DL BWP may be defined by a subcarrier spacing (SCS) and a cyclic prefix (CP) which are configured to receive a PDCCH in a control resource set (CORESET) for a Type-0 PDCCH CSS set. Alternatively, the initial active DL BWP may be provided by the higher layer parameter (initialDownlinkBWP). For operation in a primary cell or a secondary cell, the UE may receive the initial active UL BWP using the higher layer parameter (initialUplinkBWP). If a supplementary UL carrier is configured for the UE, the UE may receive the initial active UL BWP on the supplementary UL carrier by the higher layer parameter (initialUplinkBWP) in a supplementary uplink (supplementaryUplink).

If the UE has a dedicated BWP configuration, the UE may receive a first active DL BWP for data reception by a higher layer parameter (firstActiveDownlinkBWP-Id), and may receive a first active UL BWP for data transmission on carriers of the primary cell by a higher layer parameter (firstActiveUplinkGBWP-Id).

For each DL BWP in the set of DL BWPs or each UL BWP in the set of UL BWPs, the UE may receive the following parameters.

Subcarrier Spacing (SCS) provided based on higher layer parameters (e.g., subcarrierSpacing)

Cyclic Prefix (CP) provided based on higher layer parameters (e.g., cyclicPrefix)

Common RB and the number of consecutive RBs may be provided based on higher layer parameters (locationAndBandwidth). In this case, the higher layer parameter (locationAndBandwidth) may indicate offsets $RB_{start}$ and $L_{RB}$ based on a resource indication value (RIV). Here, it is assumed that $N^{size}_{BWP}$ is set to 275 and $O_{carrier}$ is provided by OffsetToCarrier for higher layer parameters (subcarrierSpacing).

Index for each set of DL BWPs or Index for each set of UL BWPs provided based on DL or UL higher layer parameters (e.g., bwp-Id)

BWP-common set parameter or BWP-dedicated set parameter provided based on higher layer parameters (e.g., bwp-Common or bwp-Dedicated)

In unpaired spectrum operation, if the DL BWP index is identical to the UL BWP index, DL BWP in the set of DL BWPs configured to have an index provided by higher layer parameters (e.g., bwp-Id) may be linked to UL BWP in the set of UL BWPs configured to have the same index as the index of the DL BWP set. In unpaired spectrum operation, if the higher layer parameter (bwp-Id) for DL BWP is identical to the higher layer parameter (bwp-Id) for UL BWP, the UE does not expect that an intermediate frequency for DL BWP receives a configuration different from that of the intermediate frequency for UL BWP.

For each DL BWP in the set of DL BWPs of either a primary cell (hereinafter referred to as a PCell) or a PUCCH secondary cell (hereinafter referred to as a PUCCH-SCell), the UE may configure a CORESET for all Common Search Space (CSS) sets and a UE-specific Search Space (USS). The UE does not expect that a configuration is established without having the Common Search Space (CSS) in a PCell or PUCCH-SCell contained in an active DL BWP.

If the UE receives controlResourceSetZero and searchSpaceZero contained in a higher layer parameter (PDCCH-ConfigSIB1) or a higher layer parameter (PDCCH-ConfigCommon), the UE may determine a CORESET for a search space set based on the higher layer parameter (controlResourcesetZero), and may determine PDCCH monitoring occasions corresponding to the CORESET. If the active DL BWP is not set to the initial DL BWP, the UE may determine PDCCH monitoring occasions only when the CORESET bandwidth is in the active DL BWP that has the same SCS configuration and CP as those of the initial DL BWP.

For each UL BWP in the set of UL BWPs of either PCell or PUCCH-SCell, the UE may receive resource sets for PUCCH transmission.

In DL BWP, the UE may receive a PDCCH or PDSCH based on the SCS and CP length configured for the DL BWP.

In UL BWP, the UE may transmit a PUCCH or PUSCH based on the SCS and CP length configured for the UL BWP.

If a bandwidth part indicator field in DCI format 1_1 is configured, a value of the bandwidth part indicator field may indicate the active DL BWP for DL reception in the configured DL BWP set. If a bandwidth part indicator field in DCI format 0_1 is configured, the bandwidth part indicator field may indicate the active UL BWP for UL transmission in the configured UL BWP set.

If the bandwidth part indicator field in DCI format 0_1 or DCI format 1_1 is configured and this configured bandwidth part indicator field indicates each of the UL BWP different from the active UL BWP and the DL BWP different from the active DL BWP, the UE can operate as follows.

For each information field contained in the received DCI format 0_1 or DCI format 1_1

If the information field is smaller in size than a necessary field required to interpret DCI format 0_1 or DCI format 1_1 for each of UL BWP and DL BWP indicated by the bandwidth part indicator, before the UE interprets each of the DCI format 0_1 information field and the DCI format 1_1 information field, the UE prepends zero "0" to the information field until the size of the information field reaches the size of the necessary field required to interpret the information field for UL BWP or DL BWP.

If the information field is larger in size than a necessary field required to interpret DCI format 0_1 or DCI format 1_1 for each of UL BWP and DL BWP indicated by the bandwidth part (BWP) indicator, before the UE interprets each of the DCI format 0_1 information field and the DCI format 1_1 information field, the UE may use as many least significant bits (LSBs) of DCI format 0_1 or DCI format 1_1 as the number of LSBs needed for the size for UL BWP or DL BWP indicated by the bandwidth part (BWP) indicator.

The UE may set the active UL BWP or the active DL BWP to UL BWP or DL BWP indicated by the bandwidth part (BWP) indicator contained in DCI format 0_1 or DCI format 1_1.

The UE does not expect to detect a time domain resource allocation field and each of DCI format 1_1 and DCI format 0_1 indicating a change of the active DL BWP or the active UL BWP. Here, the time domain resource allocation field provides a slot offset value that is smaller than a delay needed for the UE scheduled to change the active DL BWP or the active UL BWP.

If the UE detects the DCI format 1_1 indicating a change of the active DL BWP of one cell, the UE is not required to transmit or receive signals used in the cell during a time period that ranges from a third symbol (which is spaced apart from the end of a slot in which the UE has received a PDCCH including DCI format 1_1) to a start point of a slot indicated by a slot offset value of a time domain resource allocation field contained in the DCI format 1_1.

If the UE detects the DCI format 0_1 indicating a change of the active UL BWP of one cell, the UE is not required to transmit or receive signals used in the cell during a time period that ranges from a third symbol (which is spaced apart from the end of a slot in which the UE has received a PDCCH including DCI format 0_1) to a start point of a slot indicated by a slot offset value of a time domain resource allocation field contained in the DCI format 0_1.

The UE does not expect to detect either DCI format 1_1 for indicating a change of the active DL BWP or DCI format 0_1 for indicating a change of the active UL BWP in a slot that does not correspond to a first slot of a slot set for SCS of a cell that overlaps with a time period in which reception or transmission of signals is not required to change the active BWP belonging to another cell.

Only when the corresponding PDCCH in the first three symbols from among symbols belonging to one slot is received, the UE expects to detect DCI format 0_1 for indicating a change of the active UL BWP or DCI format 1_1 for indicating a change of the active DL BWP.

For the serving cell, the UE may receive a higher layer parameter (defaultDownlinkBWP-Id) indicating a default DL BWP from among the configured DL BWPs. If the UE does not receive the default DL BWP through the higher layer parameter (defaultDownlinkBWP-Id), the default DL BWP may be set to the initial active DL BWP.

If the UE receives a timer value for PCell by a higher layer parameter (bwp-InactivityTimer) and the timer starts operation (running), and if a restart condition is not satisfied either for a time period corresponding to a subframe for FR1 (Frequency Range 1 below 6 GHz) or for a time period corresponding to a half subframe for FR2 (Frequency Range 2 above 6 GHz), the UE may decrease the timer either at the end point of the subframe for FR1 or at the end point of the half subframe for FR2.

In order to delay a change of the active DL BWP or a change of the active UL BWP either by a request of a cell in which the UE has changed the active DL BWP by BWP inactivity timer expiration or by a UE request, the UE need not receive or transmit signals in the above-mentioned cell during a time period immediately after expiration of the BWP inactivity timer. Here, the time period may range from a start point of either the subframe for FR1 or the half subframe for FR2 to a start point of a slot in which the UE can receive or transmit signals.

During a time period in which reception or transmission of signals is not required to change the active UL/DL BWPs either in a specific cell or in another cell, if the UE's BWP inactivity timer for the specific cell has expired, the UE can delay a change of the active UL/DL BWPs triggered by expiration of the BWP active timer until reaching the subframe for FR1 or the half subframe for FR2 immediately after the UE has changed the active UL/DL BWPs in the specific cell or the other cell.

If the UE receives a first active DL BWP by a higher layer parameter (firstActiveDownlinkBWP-Id) through carriers of a secondary cell or receives a first UL BWP by a higher layer parameter (firstActiveUplinkBWP-Id) through carriers of a secondary cell, the UE may use the instructed DL BWP and UL BWP as the first active DL BWP and the first active UL BWP on carriers of the secondary cell.

In paired spectrum operation, if the UE has changed the active UL BWP on a PCell during a predetermined time from a detection time of DCI format 1_0 or DCI format 1_1 to the corresponding PUCCH transmission time including HARQ-ACK information, the UE does not expect to transmit a PUCCH including HARQ-ACK information on PUCCH resources indicated by DCI format 1_0 or DCI format 1_1.

If RRM measurement is performed by the UE in a bandwidth other than the active DL BWP for the UE, the UE does not expect to monitor a PDCCH.

3. Unlicensed Band System

FIG. 13 illustrates an exemplary wireless communication system supporting an unlicensed band, which is applicable to the present disclosure.

In the following description, a cell operating in a licensed band (hereinafter, referred to as L-band) is defined as an L-cell, and a carrier of the L-cell is defined as a (DL/UL) LCC. In addition, a cell operating in an unlicensed band (hereinafter, referred to as a U-band) is defined as a U-cell, and a carrier of the U-cell is defined as a (DL/UL) UCC. The carrier/carrier-frequency of the cell may refer to the operating frequency (e.g., center frequency) of the cell. A cell/carrier (e.g., CC) is collectively referred to as a cell.

As illustrated in FIG. 13($a$), when the UE and the BS transmit and receive signals in carrier-aggregated LCC and UCC, the LCC may be configured as a primary CC (PCC) and the UCC may be configured as a secondary CC (SCC).

As illustrated in FIG. 13($b$), the UE and the BS may transmit and receive signals in one UCC or a plurality of carrier-aggregated LCC and UCC. That is, the UE and the BS may transmit and receive signals only in the UCC(s) without the LCC.

The above-described operation of transmitting and receiving a signal in an unlicensed band according to the present disclosure may be performed based on all the deployment scenarios described above (unless otherwise stated).

3.1. Radio Frame Structure for Unlicensed Band

Frame structure type 3 of LTE or the NR frame structure may be used for operation in the unlicensed band. The configuration of OFDM symbols occupied for a UL/DL signal transmission in the frame structure for the unlicensed band may be configured by the BS. Herein, an OFDM symbol may be replaced with an SC-FDM(A) symbol.

For a DL signal transmission in the unlicensed band, the BS may indicate the configuration of OFDM symbols used in subframe #n to the UE by signaling. In the following description, a subframe may be replaced with a slot or a TU.

3.2. DL Channel Access Procedure (DL CAP)

For a DL signal transmission in the unlicensed band, the BS may perform a DL CAP for the unlicensed band. On the assumption that the BS is configured with a PCell that is a licensed band and one or more SCells which are unlicensed bands, a DL CAP operation applicable to the present disclosure will be described below in detail, with the unlicensed bands represented as licensed assisted access (LAA) SCells. The DL CAP operation may be applied in the same manner even when only an unlicensed band is configured for the BS.

3.2.1. Channel Access Procedure for Transmission(s) Including PDSCH/PDCCH/EPDCCH The BS senses whether a channel is in an idle state for a slot duration of a defer duration $T_d$. After a counter N is decremented to 0 in step 4 as described later, the BS may perform a transmission including a PDSCH/PDCCH/EPDCCH on a carrier on which the next unlicensed band cell (e.g. LAA SCell(s) or NR-U cell, etc.) transmission is performed. The counter N may be adjusted by sensing the channel for an additional slot duration according to the following procedure.

1) Set $N=N_{init}$ where $N_{init}$ is a random number uniformly distributed between 0 and $CW_p$, and go to step 4.

2) If N>0 and the BS chooses to reduce the counter, set N=N−1.

3) Sense the channel for an additional slot duration, and if the additional slot duration is idle, go to step 4. Else, go to step 5.

4) If N=0, stop. Else, go to step 2.

5) Sense the channel until a busy slot is detected within the additional defer duration $T_d$ or all slots of the additional defer duration $T_d$ are sensed as idle.

6) If the channel is sensed as idle for all slot durations of the additional defer duration $T_d$, go to step 4. Else, go to step 5.

The above-described CAP for a transmission including a PDSCH/PDCCH/EPDCCH of the BS may be summarized as follows.

Figure 14:
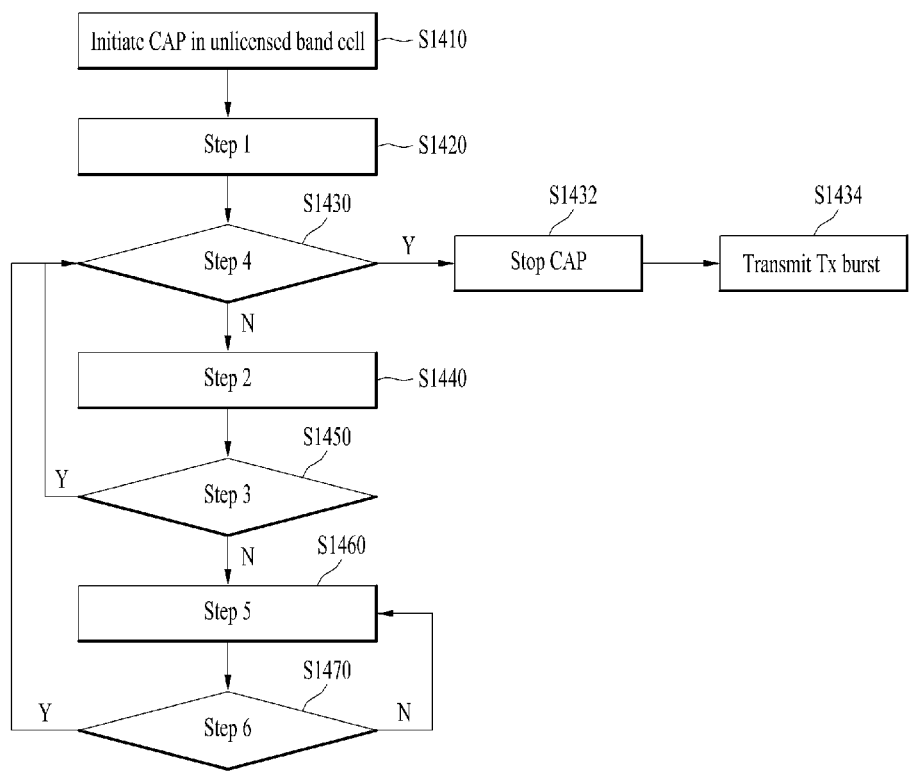
FIG. 14 is a flowchart illustrating a channel access procedure (CAP) for transmitting an unlicensed band according to embodiments of the present disclosure.

FIG. 14 is a flowchart illustrating a CAP for transmission in an unlicensed band, which is applicable to the present disclosure.

For a DL transmission, a transmission node (e.g., a BS) may initiate the CAP to operate in LAA SCell(s) which is the unlicensed band cell (e.g. LAA SCell(s) or NR-U cell, etc.) (S1410).

The BS may randomly select a backoff counter N within a contention window (CW) according to step 1. N is set to an initial value, $N_{init}$ (S1420). $N_{init}$ is a random value selected from among the values between 0 and $CW_p$.

Subsequently, if the backoff counter N is 0 in step 4 (Y in S1430), the BS terminates the CAP (S1432). Subsequently, the BS may perform a Tx burst transmission including a PDSCH/PDCCH/EPDCCH (S1434). On the other hand, if the backoff counter N is not 0 (N in S1430), the BS decrements the backoff counter N by 1 according to step 2 (S1440).

Subsequently, the BS determines whether the channel of the LAA SCell(s) is in an idle state (S1450). If the channel is in the idle state (Y in S1450), the BS determines whether the backoff counter N is 0 (S1430).

On the contrary, if the channel is not idle in step S1450, that is, the channel is busy (N in S1450), the BS determines whether the channel is in the idle state for a defer duration $T_d$ (25 usec or more) longer than a slot time (e.g., 9 usec) according to step 5 (S1460). If the channel is idle for the defer duration (Y in S1470), the BS may resume the CAP.

For example, if the backoff counter $N_{init}$ is 10 and then reduced to 5, and the channel is determined to be busy, the BS senses the channel for the defer duration and determines whether the channel is idle. If the channel is idle for the defer duration, the BS may resume the CAP from a backoff counter value 5 (or from a backoff counter value 4 after decrementing the backoff counter value by 1).

On the other hand, if the channel is busy for the defer duration (N in S1470), the BS re-performs step S1460 to check again whether the channel is idle for a new defer duration.

In the above procedure, if the BS does not perform the transmission including the PDSCH/PDCCH/EPDCCH on the carrier on which the unlicensed band cell (e.g. LAA SCell(s) or NR-U cell, etc.) transmission is performed after step 4, the BS may perform the transmission including the PDSCH/PDCCH/EPDCCH on the carrier, when the following conditions are satisfied:

When the BS is prepared to transmit the PDSCH/PDCCH/EPDCCH and the channel is sensed as idle for at least a slot duration $T_{sl}$, or for all slot durations of the defer duration $T_d$ immediately before the transmission; and On the contrary, when the BS does not sense the channel as idle for the slot duration $T_{sl}$ or for any of the slot durations of the defer duration $T_d$ immediately before the intended transmission, the BS proceeds to step 1 after sensing the channel as idle for a slot duration of the defer duration $T_d$.

The defer duration $T_d$ includes a duration of $T_f$ (=16 us) immediately followed by $m_p$ consecutive slot durations where each slot duration $T_{sl}$ is 9 us, and $T_f$ includes an idle slot duration $T_{sl}$ at the start of $T_f$.

If the BS senses the channel for the slot duration $T_{sl}$ and power detected by the BS for at least 4 us within the slot duration is less than an energy detection threshold $X_{Thresh}$, the slot duration $T_{sl}$ is considered to be idle. Otherwise, the slot duration $T_{sl}$ is considered to be busy.

$CW_{min,p} \leq CW_p \leq CW_{max,p}$ represents a contention window. $CW_p$ adjustment will be described in section 3.2.3.

$CW_{min,p}$ and $CW_{max,p}$ are chosen before step 1 of the above procedure.

$m_p$, $CW_{min,p}$, and $CW_{max,p}$ are based on a channel access priority class associated with the transmission of the BS (see Table 4 below).

$X_{Thresh}$ is adjusted according to section 3.2.4.

TABLE 4

| Channel Access Priority Class (p) | $m_p$ | $CW_{min,p}$ | $CW_{max,p}$ | $T_{mcot,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

If the BS performs a discovery signal transmission which does not include a PDSCH/PDCCH/EPDCCH when N>0 in the above procedure, the BS does not decrement N for a slot duration overlapping with the discovery signal transmission.

The BS does not continuously perform transmissions on the channel, for a period exceeding $T_{mcot,p}$ as given in Table 4 on the carrier on which the unlicensed band cell (e.g. LAA SCell(s) or NR-U cell, etc.) transmission is performed.

For p=3 and p=4 in Table 4, if the absence of any other technology sharing the carrier may be guaranteed on a long term basis (e.g., by level of regulation), $T_{mcot,p}$=10 ms and otherwise, $T_{mcot,p}$=8 ms.

3.2.2. Channel Access Procedure for Transmissions Including Discovery Signal Transmission(S) and Not Including PDSCH If the transmission duration of the BS is 1 ms or less, the BS may perform a transmission including a discovery signal transmission without a PDSCH on a carrier on which the unlicensed band cell (e.g. LAA SCell(s) or NR-U cell, etc.) transmission is performed, immediately after a corresponding channel is sensed as idle for at least a sensing interval $T_{drs}$ (=25 us). $T_{drs}$ includes a duration of $T_f$ (=16 us) immediately followed by one slot duration $T_{sl}$ (=9 us). $T_f$ includes an idle slot duration $T_{sl}$ at the start of $T_f$. If the channel is sensed as idle for the slot duration $T_{drs}$, the channel is considered to be idle for $T_{drs}$.

3.2.3. Contention Window Adjustment Procedure

If the BS performs a transmission including a PDSCH associated with a channel access priority class p on a carrier, the BS maintains and adjusts a contention window value $CW_p$ by using the following procedures before step 1 of the procedure described in section 2.2.1. for the transmission (i.e., before performing a CAP):

1> Set $CW_p=CW_{min,p}$ for all priority classes $p \in \{1, 2, 3, 4\}$.

2> If at least 80% (z=80%) of HARQ-ACK values corresponding to PDSCH transmission(s) in a reference subframe k are determined to be NACK, the BS increments $CW_p$ for all priority classes $p \in \{1, 2, 3, 4\}$ to the next higher allowed value and remains in step 2. Otherwise, the BS goes to step 1.

In other words, when the probability that the HARQ-ACK values corresponding to the PDSCH transmission(s) in reference subframe k are determined to be NACK is at least 80%, the BS increments a CW value set for each priority class to the next higher value. Alternatively, the BS maintains the CW value set for each priority class to be an initial value.

Reference subframe k is the starting subframe of the most recent transmission on the carrier made by the BS, for which at least some HARQ-ACK feedback is expected to be available.

The BS adjusts the $CW_p$ values for all priority classes $p \in \{1, 2, 3, 4\}$ only once based on the given reference subframe k.

If $CW_p=CW_{max,p}$, the next higher allowed value for the $CW_p$ adjustment is $CW_{max,p}$.

The probability Z of determining HARQ-ACK values corresponding to PDSCH transmission(s) in reference subframe k to be NACK may be determined in consideration of the following.

- If the transmission(s) of the BS for which HARQ-ACK feedback is available starts in the second slot of subframe k, HARQ-ACK values corresponding to PDSCH transmission(s) in subframe k and additionally, HARQ-ACK values corresponding to PDSCH transmission(s) in subframe k+1 are used.
- If HARQ-ACK values correspond to PDSCH transmission(s) in the same unlicensed band cell (e.g. LAA SCell(s) or NR-U cell, etc.) allocated by an (E)PDCCH transmitted in unlicensed band cell (e.g. LAA SCell(s) or NR-U cell, etc.),
- If an HARQ-ACK feedback for a PDSCH transmission of the BS is not detected or if the BS detects a 'DTX', 'NACK/DTX' or (any) other state, it is counted as NACK.
- If the HARQ-ACK values correspond to PDSCH transmission(s) in another unlicensed band cell (e.g. LAA SCell(s) or NR-U cell, etc.) allocated by an (E)PDCCH transmitted in the unlicensed band cell (e.g. LAA SCell(s) or NR-U cell, etc.),
- If an HARQ-ACK feedback for a PDSCH transmission of the BS is detected, 'NACK/DTX' or (any) other state is counted as NACK and the 'DTX' state is ignored.
- If an HARQ-ACK feedback for a PDSCH transmission of the BS is not detected,
- If it is expected that the BS will use PUCCH format 1 with channel selection, the 'NACK/DTX' state corresponding to 'no transmission' is counted as NACK, and the 'DTX' state corresponding to 'no transmission' is ignored. Otherwise, the HARQ-ACK for the PDSCH transmission is ignored.
- If the PDSCH transmission has two codewords, an HARQ-ACK value for each codeword is considered individually.
- A bundled HARQ-ACK across M subframes is considered to be M HARQ-ACK responses.
- If the BS performs a transmission which includes a PDCCH/EPDDCH with DCI format 0A/0B/4A/4B and does not include a PDSCH associated with the channel access priority class p on a channel starting from time $t_0$, the BS maintains and adjusts the competing window size $CW_p$ by using the following procedures before step 1 of the procedure described in section 3.2.1. for the transmission (i.e., before performing the CAP):

1> Set $CW_p=CW_{min,p}$ for all priority classes $p \in \{1, 2, 3, 4\}$.

2> If a UE using a type 2 CAP (described in section 3.3.1.2.) successfully receives less than 10% of UL transport blocks (TBs) scheduled by the BS during a time period $t_0$ and $t_0+T_{CO}$, the BS increments $CW_p$ for all priority classes to the next higher allowed value and remains in step 2. Otherwise, the BS goes to step 1.

$T_{CO}$ is calculated according to section 2.3.1.

If $CW_p=CW_{max,p}$ is used K times consecutively to generate $N_{init}$, only $CW_p$ for a priority class p for $CW_p=CW_{max,p}$ used K times consecutively to generate $N_{init}$ is reset to $CW_{min,p}$. the BS then selects K from a set of $\{1, 2, \ldots, 8\}$ values for each priority class $p \in \{1, 2, 3, 4\}$.

3.2.4. Energy Detection Threshold Adaptation Procedure

ABS accessing a carrier on which the unlicensed band cell (e.g. LAA SCell(s) or NR-U cell, etc.) transmission is performed sets an energy detection threshold $X_{Thresh}$ to a maximum energy detection threshold $X_{Thresh\_max}$ or less.

The maximum energy detection threshold $X_{Thresh\_max}$ is determined as follows.

If the absence of any other technology sharing the carrier may be guaranteed on a long term basis (e.g., by level of regulation), $$X_{Thresh\_max} = \min\left\{ \begin{array}{l} T_{max} + 10 \text{ dB,} \\ X_r \end{array} \right\}$$

where $X_r$ is the maximum energy detection threshold (in dBm) defined in regulatory requirements, when the regulation is defined. Otherwise, $X_r=T_{max}+10$ dB.

Else, $$X_{Thres\_max} = \max\left\{ \begin{array}{l} -72 + 10 \cdot \log 10(BWMHz/20 \text{ MHz}) \text{ dBm,} \\ \min\left\{ \begin{array}{l} T_{min}, \\ T_{max} - T_A + (P_H + 10 \cdot \log 10(BWMHz/20 \text{ MHz}) - P_{TX}) \end{array} \right\} \end{array} \right\}$$

Herein, each variable is defined as follows.

3.2.5. Channel Access Procedure for Transmission(S) on Multiple Carriers

The BS may access multiple carriers on which the unlicensed band cell (e.g. LAA SCell(s) or NR-U cell, etc.) transmission is performed in one of the following type A or type B procedures.

3.2.5.1. Type A Multi-Carrier Access Procedures

According to the procedure described in this section, the BS performs channel access on each carrier where $c_i \in C$ is a set of intended carriers to be transmitted by the BS, i=0,1, . . . q−1, and q is the number of carriers to be transmitted by the BS.

The counter N described in section 3.2.1 (i.e., the counter N considered in the CAP) is determined for each carrier $c_j$, and in this case, the counter for each carrier is represented as $N_{c_i} \cdot N_{c_i}$ is maintained according to section 3.2.5.1.1. or section 3.2.5.1.2.

3.2.5.1.1. Type A1

The counter N described in section 3.2.1 (i.e., the counter N considered in the CAP) is determined for each carrier $c_i$, and the counter for each carrier is represented as $N_{c_i}$.

In the case where the BS ceases a transmission on one carrier $c_j \in C$, if the absence of any other technology sharing the carrier may be guaranteed on a long term basis (e.g., by level of regulation), the BS may resume $N_{c_i}$ reduction, when an idle slot is detected after waiting for a duration of $4 \cdot T_{sl}$ or reinitializing $N_{c_i}$ for each carrier $c_i$ (where $c_i$ is different from $c_j$, $c_i \neq c_j$).

3.2.5.1.2. Type A2

The counter N for each carrier $c_j \in C$ may be determined according to section 2.2.1., and is denoted by $N_{c_j}$. Here, $c_j$ may mean a carrier having the largest $CW_p$ value. For each carrier $c_j$, $N_{c_i} = N_{c_j}$.

When the BS ceases a transmission on any one carrier for which $N_{c_i}$ has been determined by the BS, the BS reinitializes $N_{c_i}$ for all carriers.

3.2.5.2. Type B Multi-Carrier Access Procedure

A carrier $c_j \in C$ may be selected by the BS as follows.

The BS selects $c_j$ uniformly randomly from C before each transmission on multiple carriers $c_i \in C$, or The BS does not select $c_j$ more than once every one second.

Herein, C is a set of carriers to be transmitted by the BS, $i=0,1,\ldots q-1$, and q is the number of carriers to be transmitted by the BS.

For a transmission on a carrier $c_j$, the BS performs channel access on the carrier $c_j$ according to the procedure described in section 2.2.1 along with the modification described in section 2.2.5.2.1 or section 2.2.5.2.2.

For a transmission on the carrier $c_i \neq c_j$ among the carriers $c_i \in C$, For each carrier $c_i$, the BS senses the carrier $c_i$ for at least a sensing interval $T_{mc}=25$ us immediately before the transmission on the carrier $c_i$. The BS may perform a transmission on the carrier $c_i$ immediately after sensing that the carrier $c_i$ is idle for at least the sensing interval $T_{mc}$. When the channel is sensed as idle during all time periods in which idle sensing is performed on the carrier $c_j$ within the given period $T_{mc}$, the carrier $c_i$ may be considered to be idle for $T_{mc}$.

The BS does not continuously perform transmissions on the carrier $c_i \neq c_j$ ($c_i \in C$) for a period exceeding $T_{mcot,p}$ as given in Table 4. $T_{mcot,p}$ is determined using the channel access parameter used for the carrier $c_j$.

3.2.5.2.1. Type B1

A single $CW_p$ value is maintained for the carrier set C.

To determine $CW_p$ for channel access on a carrier $c_j$, step 2 in the procedure described in section 3.2.3. is modified as follows.

If at least 80% (Z=80%) of HARQ-ACK values corresponding to PDSCH transmission(s) in reference subframe k of all carriers $c_i \in C$ are determined to be NACK, then $CW_p$ for all priority classes $p \in \{1, 2, 3, 4\}$ is incremented to the next higher allowed value. Otherwise, the procedure goes to step 1.

3.2.5.2.2. Type B2 (Type B2)

The $CW_p$ value is maintained independently for each carrier $c_i \in C$ by using the procedure described in section 3.2.3. To determine $N_{init}$ for the carrier $c_j$, the $CW_p$ value of the carrier $c_{j1} \in C$ is used. Here, $c_{j1}$ is a carrier having the largest $CW_p$ among all carriers in the set C.

3.3. Uplink Channel Access Procedures

2.3.1. Channel Access Procedure for Uplink Transmission(s)

The UE and the BS that schedules a UL transmission for the UE perform the following procedure for access to a channel in which the unlicensed band cell (e.g. LAA SCell (s) or NR-U cell, etc.) transmission(s) is performed. On the assumption that the UE and the BS are basically configured with a PCell that is a licensed band and one or more SCells which are unlicensed bands, a UL CAP operation applicable to the present disclosure will be described below in detail, with the unlicensed bands represented as LAA SCells. The UL CAP operation may be applied in the same manner even when only an unlicensed band is configured for the UE and the BS.

The UE may access a carrier on which LAA SCell UL transmission(s) are performed according to a type 1 or type 2 UL CAP. The type 1 CAP is described in section 3.3.1.1, and the type 2 CAP is described in section 3.3.1.2.

If a UL grant that schedules a PUSCH transmission indicates the type 1 CAP, the UE performs type 1 channel access to perform a transmission including the PUSCH transmission, unless otherwise stated in this section.

If the UL grant that schedules the PUSCH transmission indicates the type 2 CAP, the UE performs type 2 channel access to perform a transmission including the PUSCH transmission, unless otherwise stated in this section.

The UE performs type 1 channel access for an SRS transmission that does not include a PUSCH transmission. A UL channel access priority class $p=1$ is used for the SRS transmission that does not include a PUSCH.

TABLE 5

| Channel Access Priority Class (p) | $m_p$ | $CW_{min,p}$ | $CW_{max,p}$ | $T_{ulmcot,p}$ | allowed $CW_p$ sizes |
|---|---|---|---|---|---|
| 1 | 2 | 3 | 7 | 2 ms | {3, 7} |
| 2 | 2 | 7 | 15 | 4 ms | {7, 15} |

TABLE 5-continued

| Channel Access Priority Class (p) | $m_p$ | $CW_{min,p}$ | $CW_{max,p}$ | $T_{ulmcot,p}$ | allowed $CW_p$ sizes |
|---|---|---|---|---|---|
| 3 | 3 | 15 | 1023 | 6 ms or 10 ms | {15, 31, 63, 127, 255, 511, 1023} |
| 4 | 7 | 15 | 1023 | 6 ms or 10 ms | {15, 31, 63, 127, 255, 511, 1023} |

NOTE 1:
For p = 3,4, $T_{ulmcot,p}$ = 10 ms if the higher layer parameter 'absesenceOfAnyOtherTechnology-r14' indicates TRUE, otherwise, $T_{ulmcot,p}$ = 6 ms.
NOTE 2:
When $T_{ulmcot,p}$ = 6 ms it may be increased to 8 ms by inserting one or more gaps. The minimum duration of a gap shall be 100 μs. The maximum duration before including any such gap shall be 6 ms.

When the 'UL configuration for LAA' field configures 'UL offset' l and 'UL duration' d for subframe n, If the end of a UE transmission occurs in or before subframe n+l+d−1, the UE may use the type 2 CAP for transmission in subframe n+l+i (where i=0,1, . . . d−1).

If the UE is scheduled to perform a transmission including a PUSCH in a subframe set $n_0$, $n_1$, . . . , $n_{w-1}$ by using PDCCH DCI format 0B/4B, and the UE may not perform channel access for transmission in subframe $n_k$, the UE should attempt to make a transmission in subframe $n_{k+1}$ according to a channel access type indicated by DCI. k∈{0, 1, . . . w−2} and w is the number of scheduled subframes indicated by the DCI.

If the UE is scheduled to perform a transmission including a PUSCH without gaps in the subframe set $n_0$, $n_1$, . . . , $n_{w-1}$ by using one or more of PDCCH DCI formats 0A/0B/4A/4B, and performs a transmission in subframe $n_k$ after accessing a carrier according to the type 1 or type 2 CAP, the UE may continue the transmission in a subframe after $n_k$ where k∈{0,1, . . . w−1}.

If the start of the UE transmission in subframe n+1 immediately follows the end of the UE transmission in subframe n, the UE does not expect that a different channel access type will be indicated for the transmission in the subframe.

If the UE is scheduled to perform a transmission without gaps by using one or more of PDCCH DCI formats 0A/0B/4A/4B, stops the transmission during or before subframe $n_{k1}$ (where k1∈{0,1, . . . w−2}), and continuously senses the corresponding channel as idle after stopping the transmission, the UE may perform the transmission in the type 2 CAP after subframe $n_{k2}$ (where k2∈{1, . . . w−1}). If the channel is not sensed continuously as idle by the UE after the UE stops the transmission, the UE may perform the transmission in the type 1 CAP of a UL channel access priority class indicated by DCI corresponding to subframe $n_{k2}$ after subframe $n_{k2}$ (where k2∈{1, . . . w−1}).

If the UE receives a UL grant, DCI indicates the UE to start a PUSCH transmission in subframe n by using the type 1 CAP, and the UE has an ongoing type 1 CAP before subframe n,
  If a UL channel access priority class value p1 used for the ongoing type 1 CAP is equal to or greater than a UL channel access priority class value p2 indicated by the DCI, the UE may perform the PUSCH transmission by accessing a carrier in the ongoing type 1 CAP.
  If the UL channel access priority class value p1 used for the ongoing type 1 CAP is less than the UL channel access priority class value p2 indicated by the DCI, the UE terminates the ongoing type 1 CAP.

If the UE is scheduled to transmit on a carrier set C in subframe n, a UL grant scheduling a PUSCH transmission on the carrier set C indicates the type 1 CAP, the same 'PUSCH starting position' is indicated for all carriers of the carrier set C, and the carrier frequencies of the carrier set C are a subset of a preset carrier frequency set,
  The UE may perform a transmission on a carrier $c_i$∈C in the type 2 CAP.
  If the type 2 CAP has been performed on the carrier $c_i$ immediately before the UE transmission on a carrier $c_i$∈C, and
  If the UE has accessed the carrier $c_j$ by using the type 1 CAP,
  Before performing the type 1 CAP on any one carrier in the carrier set C, the UE uniformly randomly selects the carrier $c_j$ from the carrier set C.

When the BS has transmitted on the carrier according to the CAP described in section 3.2.1, the BS may indicate the type 2 CAP by DCI in a UL grant that schedules a transmission including a PUSCH on the carrier in subframe n.

Alternatively, when the BS has transmitted on the carrier according to the CAP described in section 3.2.1, the BS may indicate that the type 2 CAP is available for the transmission including the PUSCH on the carrier in subframe n by the 'UL Configuration for LAA' field.

Alternatively, when subframe n occurs within a time period starting from $t_0$ and ending at $t_0+T_{CO}$, the BS may schedule the transmission including the PUSCH on the carrier within subframe n following a transmission of a duration $T_{short\_ul}$=25 us from the BS. $T_{CO}=T_{mcot,p}+T_g$ and each variable may be defined as follows.

t0: a time instant at which the BS starts a transmission.
  $T_{mcot,p}$: determined by the BS according to section 3.2.
  $T_g$: the total period of all gap periods exceeding 25 us occurring between a DL transmission of the BS starting from to and a UL transmission scheduled by the BS and between two UL transmissions scheduled by the BS.

If the UL transmissions are scheduled in succession, the BS schedules the UL transmissions between consecutive subframes in $t_0$ and $t_0+T_{CO}$.

For the UL transmission on the carrier following the transmission of the BS on the carrier within the duration $T_{short\_ul}$=25 us, the UE may perform the type 2 CAP for the UL transmission.

If the BS indicates the type 2 CAP for the UE by DCI, the BS indicates a channel access priority class used to obtain access to the channel in the DCI.

3.3.1.1. Type 1 UL Channel Access Procedure

After sensing that the channel is idle for a slot duration of a defer duration $T_d$ and the counter N becomes 0 in step 4, the UE may perform a transmission using the type 1 CAP. The counter N is adjusted by sensing the channel for additional slot duration(s) according to the following procedure.

1) Set N=$N_{init}$ where $N_{init}$ is a random number uniformly distributed between 0 and $CW_p$, and go to step 4.

2) If N>0 and the BS chooses to decrement the counter, set N=N−1.

3) Sense the channel for an additional slot duration, and if the additional slot duration is idle, go to step 4. Else, go to step 5.

4) If N=0, stop. Else, go to step 2.

5) Sense the channel during all slot durations of an additional defer duration $T_d$.

6) If the channel is sensed as idle during the slot durations of the additional defer duration $T_d$, go to step 4. Else, go to step 5.

The above-described type 1 UL CAP of the UE may be summarized as follows.

For a UL transmission, a transmission node (e.g., a UE) may initiate the CAP to operate in LAA SCell(s) which is an unlicensed band cell (S1410).

The UE may randomly select a backoff counter N within a CW according to step 1. N is set to an initial value $N_{init}$ (S1420). $N_{init}$ is a value selected randomly from among the values between 0 and $CW_p$.

Subsequently, if the backoff counter value N is 0 according to step 4 (Y in S1430), the UE ends the CAP (S1432). Subsequently, the UE may perform a Tx burst transmission (S1434). On the other hand, if the backoff counter value is not 0 (N in S1430), the UE decrements the backoff counter value by 1 according to step 2 (S1440).

Subsequently, the UE checks whether the channel of the unlicensed band cell (e.g. LAA SCell(s) or NR-U cell, etc.) is idle (S1450). If the channel is idle (Y in S1450), the UE checks whether the backoff counter value is 0 (S1430).

On the contrary, if the channel is not idle in step S1450, that is, the channel is busy (N in S1450), the UE checks whether the channel is idle for a defer duration $T_d$ (25 usec or more) longer than a slot time (e.g., 9 usec) according to step 5 (S1460). If the channel is idle for the defer duration (Y in S1470), the UE may resume the CAP.

For example, if the backoff counter value $N_{init}$ is 10 and the channel is determined to be busy after the backoff counter value is decremented to 5, the UE determines whether the channel is idle by sensing the channel for the defer duration. In this case, if the channel is idle for the defer duration, the UE may perform the CAP again from the backoff counter value 5 (or from the backoff counter value 4 after decrementing the backoff counter value by 1), instead of setting the backoff counter value $N_{init}$.

On the other hand, if the channel is busy for the defer duration (N in S1470), the UE re-performs S1460 to check again whether the channel is idle for a new defer duration.

In the above procedure, if the UE does not perform the transmission including the PUSCH on the carrier in which LAA SCell transmission(s) is performed after step 4 of the afore-described procedure, the UE may perform the transmission including the PUSCH on the carrier, when the following conditions are satisfied:

When the UE is prepared to transmit the transmission including the PUSCH and the channel is sensed as idle during at least the slot duration $T_{sl}$; and When the channel is sensed as idle during all slot durations of the defer duration $T_d$ immediately before the transmission including the PUSCH.

On the contrary, when the UE senses the channel for the first time after being prepared for the transmission, if the channel is not sensed as idle during the slot duration $T_{sl}$, or during any of all slot durations of the defer duration $T_d$ immediately before the intended transmission including the PUSCH, the UE proceeds to step 1 after sensing the channel as idle during the slot durations of the defer duration $T_d$.

The defer duration $T_d$ includes a duration of $T_f$ (=16 us) immediately followed by $m_p$ consecutive slot durations where each slot duration $T_{sl}$ is 9 us, and $T_f$ includes an idle slot duration $T_{sl}$ at the start of $T_f$.

If the UE senses the channel during the slot duration $T_{sl}$ and power measured by the UE for at least 4 us in the slot duration is less than an energy detection threshold $X_{Thresh}$, the slot duration $T_{sl}$ is considered to be idle. Otherwise, the slot duration $T_{sl}$ is considered to be busy.

$CW_{min,p} \le CW_p \le CW_p$ represents a contention window, and $CW_p$ adjustment is described in detail in section 3.3.2.

$CW_{min,p}$ and $CW_{max,p}$ are chosen before step 1 of the above procedure.

$m_p$, $CW_{min,p}$, and $CW_{max,p}$ are determined based on a channel access priority class signaled to the UE (see Table 5 below).

$X_{Thresh}$ is adjusted according to section 3.3.3.

3.3.1.2. Type 2 UL Channel Access Procedure

If the UE uses the type 2 CAP for a transmission including a PUSCH, the UE may perform the transmission including the PUSCH immediately after sensing a channel as idle for at least a sensing duration short $T_{short\_ul}$=25 us. $T_{short\_ul}$ includes a duration of $T_f$(=16 us) immediately followed by one slot duration $T_{sl}$ (=9 us). $T_f$ includes an idle slot duration $T_{sl}$ at the start of $T_f$. If the channel is sensed as idle during the slot duration $T_{short\_ul}$, the channel is considered to be idle for $T_{short\_ul}$.

3.3.2. Contention Window Adjustment Procedure

If the UE performs a transmission using the type 1 CAP associated with a channel access priority class p on a carrier, the UE maintains and adjusts a contention window value $CW_p$ using the following procedures before step 1 of the procedure described in section 2.3.1.1. for the transmission (i.e., before performing the CAP):

When a new data indicator (NDI) for at least one HARQ process related to HARQ_ID_ref is toggled,
Set $CW_p = CW_{min,p}$ for all priority classes $p \in \{1, 2, 3, 4\}$.
Else, increment $CW_p$ to the next higher allowed value for all priority classes $p \in \{1, 2, 3, 4\}$.

HARQ_ID_ref is the HARQ process ID of a UL-SCH in reference subframe $n_{ref}$. Reference subframe $n_{ref}$ is determined as follows.

When the UE receives a UL grant in subframe $n_g$. Here, subframe $n_w$ is the most recent subframe before subframe $n_g$−3 in which the UE transmits the UL-SCH using the type 1 CAP.
If the UE performs a transmission including a UL-SCH without gaps, starting from subframe $n_0$ in a subframe $n_0, n_1, \ldots, n_w$, reference subframe $n_{ref}$ is subframe $n_0$.
Else, reference subframe $n_{ref}$ is subframe $n_w$.

If the UE is scheduled to perform a transmission including a PUSCH without gaps in a subframe set $n_0, n_1, \ldots, n_{w-1}$ and may not perform any transmission including the PUSCH in the subframe set, the UE may maintain $CW_p$ for all priority classes $p \in \{1, 2, 3, 4\}$ without changing $CW_p$.

If a reference subframe for the recent scheduled transmission is also subframe $n_{ref}$, the UE may maintain $CW_p$ for all priority classes $p \in \{1, 2, 3, 4\}$ equal to $CW_p$ for a transmission including a PUSCH, which uses the recent scheduled type 1 CAP.

If $CW_p = CW_{max,p}$ the next higher allowed value for the $CW_p$ adjustment is $CW_{max,p}$.

If $CW_p=CW_{max,p}$ is used K times consecutively to generate $N_{init}$, only $CW_p$ for a priority class p for $CW_p=CW_{max,p}$ used K times consecutively to generate $N_{init}$ is reset to $CW_{min,p}$. K is then selected by the UE from a set of $\{1, 2, \ldots, 8\}$ values for each priority class $p \in \{1, 2, 3, 4\}$.

3.3.3. Energy Detection Threshold Adaptation Procedure)

A UE accessing a carrier on which a LAA SCell transmission is performed sets an energy detection threshold $X_{Thresh}$ to a maximum energy detection threshold $X_{Thresh\_max}$ or less.

The maximum energy detection threshold $X_{Thresh\_max}$ is determined as follows.

If the UE is configured with a higher-layer parameter 'maxEnergyDetectionThreshold-r14', $X_{Thresh\_max}$ is set equal to a value signaled by the higher-layer parameter.

Else,

The UE determines $X'_{Thresh\_max}$ according to the procedure described in section 3.3.3.1.

If the UE is configured with a higher-layer parameter maxEnergyDetectionThresholdOffset-r14', $X_{Thresh\_max}$ is set to $X'_{Thresh\_max}$ adjusted according to an offset value signaled by the higher-layer parameter.

Else,

The UE sets $X_{Thresh\_max} = X'_{Thresh\_max}$.

3.3.3.1. Default Maximum Energy Detection Threshold Computation Procedure

If a higher-layer parameter 'ab senceOfAnyOtherTechnology-r14' indicates TRUE:

$$X'_{Thresh\_max} = \min\left\{\begin{array}{l} T_{max} + 10 \text{ dB}, \\ X_r \end{array}\right\}$$

where Xr is a maximum energy detection threshold (in dBm) defined in regulatory requirements when the regulation is defined. Else, $X_r = T_{max} + 10$ dB.

Else:

$$X'_{Thres\_max} = \max\left\{\begin{array}{l} -72 + 10 \cdot \log 10(BWMHz/20 \text{ MHz}) \text{ dBm}, \\ \min\left\{\begin{array}{l} T_{min}, \\ T_{max} - T_A + (P_H + 10 \cdot \log 10(BWMHz/20 \text{ MHz}) - P_{TX}) \end{array}\right\} \end{array}\right\}$$

Here, each variable is defined as follows.
$T_A = 10$ db
$P_H = 23$ dBm:
$P_{TX}$ is the set to the value of $P_{CMAX\_Hc}$ defined in 3GPP TS 36.101.
$T_{max}(\text{dBM}) = 10 \cdot \log 10(3.16228 \cdot 10^{-8}$ (mW/MHz) $\cdot$ BWMHz (MHz))
BWMHz is the single carrier bandwidth in MHz.

4. Proposed Embodiments

Structural characteristics of the structure proposed by the present disclosure will hereinafter be described with reference to the above-mentioned technical features.

Embodiments of the present disclosure may provide a method for controlling the UE to transmit a physical uplink control channel (PUCCH) or a physical uplink shared channel (PUSCH) in an unlicensed band in a wireless communication system including a base station (BS) and the user equipment (UE).

In recent years, the 3GPP standardization organizations have discussed standardization of a wireless communication system named a new radio access technology (RAT) (new RAT or NR) as an example of 5G wireless communication systems. More specifically, the NR system aims to support a plurality of logical networks in a single physical system. Thus, the NR system has been designed to support services having various requirements (e.g., enhanced mobile broadband (eMBB), massive machine type communications (mMTC), ultra-reliable low-latency communication (URLLC), etc.) by changing a transmission time interval (TTI) and/or OFDM numerology (e.g., OFDM symbol duration, subcarrier spacing (SCS), etc.).

Meanwhile, data traffic has been rapidly increasing with development of smart devices or the like. Accordingly, similar to License-Assisted Access (LAA) of the legacy 3GPP LTE system, many developers and companies are conducting intensive research into methods for utilizing and applying the unlicensed band to cellular communication even in 3GPP NR systems. Specifically, unlike LAA, a new RAT (NR) cell in an unlicensed band (hereinafter referred to as NR U-cell) of the NR system aims to support standalone operations. For example, PUCCH or PUSCH transmission from the UE can be supported.

On the other hand, according to regional regulations for the unlicensed band, before a communication node (or an arbitrary communication node) in the unlicensed band transmits signals, there is a need for the communication node in the unlicensed band to perform listen before talk (LBT) or a channel access procedure (CAP) corresponding to a process of determining whether to use channels of other nodes based on energy detection about such channels or the like. In addition, an operation of confirming whether other communication nodes transmit signals in the LBT operation is defined as carrier sensing (CS). In addition, an example in which it is determined that other communication nodes transmit no signals is defined as clear channel assessment (CCA) confirmation.

In LTE systems or NR systems, the base station (BS) and the UE have to perform LBT operation to perform signal transmission in the unlicensed band. In addition, the BS and the UE should fairly compete with other RAT(s) (e.g., Wi-Fi or the like) belonging to the unlicensed band in terms of channel occupancy.

For reference, a CCA threshold, which is an energy detection threshold for CCA in Wi-Fi standards (802.11ac), is defined either as −62 dBm for non-WiFi signals or as −82 dBm for Wi-Fi signals. This means that, when signals other than Wi-Fi signals are received at power of 62 dBm or more, the arbitrary communication node does not perform signal transmission to prevent signal interference.

Moreover, according to regional regulations for the unlicensed band, when an arbitrary node transmits signals in the unlicensed band, there is a limitation in occupying the system bandwidth of X % or more. In addition, there may also occur a Power Spectral Density (PSD) limitation in which the magnitude of transmission (Tx) power for each 1 MHz band is restricted to Y dBm. For example, according to European Telecommunications Standards Institute (ETSI) regulations corresponding to European regulations, X may be set to 80 (X=80) and Y may be set to 10 (Y=10).

Therefore, when the UE transmits a PUCCH or PUSCH, the number of exemplary cases in which transmission (Tx) power is restricted by such regulations should be minimized. Thus, the UE has to transmit PUCCH or PUSCH using a block-interleaved FDMA (B-IFDMA) structure. In this case, the B-IFDMA structure may be a structure by which the entire band is divided into a plurality of interlaces. In addition, the B-IFDMA structure may be designed in a manner that K consecutive resource elements (REs) construct one cluster in a frequency domain. A plurality of clusters in which a gap (or interval) between two contiguous clusters is denoted by L REs (or L RBs) can construct one interlace.

In other words, the B-IFDMA structure may refer to a structure, the entire band of which includes a plurality of interlaces. Here, one interlace may include a plurality of clusters, and one cluster may include K REs (or K RBs) that are consecutive on the frequency domain. In addition, a gap (or interval) between two contiguous clusters may be denoted by L REs (or L RBs). For example, when 100 RBs are present in a 20 MHz system band, the system bandwidth can be classified into 10 interlaces, each of which has a cluster size denoted by one RB (1 RB), and a gap (or interval) between clusters from among the 10 interlaces is denoted by 10 RBs.

A PUCCH may transmit uplink control information (UCI) such as HARQ-ACK or CSI for a PDSCH. In addition, it is assumed that PUCCH can classify various formats as follows according to a payload size of UCI and a transmission duration time (or the number of PUCCH transmission symbols) of UCI.

(1) PUCCH Format 0
A. Supportable UCI payload size: up to K bits (e.g., K=2)
B. The number of OFDM symbols constructing one PUCCH: 1~X symbols (e.g., X=2)
C. Transmission Structure: The transmission structure is comprised of only UCI signals without DMRS. The transmission structure may be designed to transmit a specific UCI state by selecting/transmitting only one sequence from among a predetermined number of sequences.

(2) PUCCH Format 1
A. Supportable UCI payload size: up to K bits (e.g., K=2)
B. The number of OFDM symbols constructing one PUCCH: Y Z symbols (e.g., Y=4, Z=14)
C. Transmission Structure: DMRS and UCI may be constructed/mapped in TDM formats in different symbols. UCI may be formed in a shape that is constructed by multiplying a modulation symbol (e.g., QPSK) by a specific sequence. CS/OCC may be applied to both UCI and DMRS. Therefore, multiplexing between the plurality of UEs can be supported in the same RB.

(3) PUCCH Format 2
A. Supportable UCI payload size: more than K bits (e.g., K=2)
B. The number of OFDM symbols constructing one PUCCH: 1~X symbols (e.g., X=2)
C. Transmission Structure: DMRS and UCI may be constructed/mapped in FDM formats in the same symbol. Transmission of DMRS and UCI may be achieved by applying only IFFT to coded UCI bits without applying DFT to the coded UCI bits.

(4) PUCCH Format 3
A. Supportable UCI payload size: more than K bits (e.g., K=2)
B. The number of OFDM symbols constructing one PUCCH: Y~Z symbols (e.g., Y=4, and Z=14)
C. Transmission Structure: DMRS and UCI may be constructed/mapped in TDM formats in different symbols, and DFT may be applied to coded UCI bits, such that the transmission structure can transmit signals without multiplexing between the plurality of UEs.

(5) PUCCH Format 4
A. Supportable UCI payload size: more than K bits (e.g., K=2)
B. The number of OFDM symbols constructing one PUCCH: Y~Z symbols (e.g., Y=4, and Z=14)
C. Transmission Structure: DMRS and UCI may be constructed/mapped in TDM formats in different symbols, and DFT may be applied to coded UCI bits. In addition, OCC is applied to a front end of DFT, and CS (or IFDM mapping) is applied to DMRS, such that it may be possible to support multiplexing between the UEs.

A flexible OFDM numerology of the NR system, the B-IFDMA structure for U-band, and a method for transmitting PUCCH and PUSCH of the NR system considering LBT operations will hereinafter be described with reference to the attached drawings.

In the following description, the term "RB (resource block)" may refer to a resource allocation unit on a frequency axis (frequency domain). For example, RB may refer to a unit composed of 12 consecutive resource elements (REs) on the frequency axis (frequency domain) or subcarriers on the frequency axis (frequency domain).

In the following description, the bandwidth part (BWP) may refer to a sub-band that can be used to transmit/receive data in the entire system band.

4.1 Interlace Structure

In NR U-band according to embodiments of the present disclosure, signal transmission based on multiple clusters may be considered useful by referring to regulations (e.g., restriction that the system bandwidth of 80% or more should be occupied) for bandwidth usage about the unlicensed band and regulations about PSD restriction.

In accordance with one embodiment of the present disclosure, one interlace resource on the frequency axis (frequency domain) may be defined as a plurality of clusters, each of which has a constant cluster size and a constant cluster interval.

Here, when PRB(s) of multiple interlace resource(s) are allocated to PUSCH (or PUCCH) transmission resources, the cluster size and the cluster interval of such interlace resources can be defined as any one of the following cluster sizes (1), (2) and (3) according to OFDM numerology.

(1) Cluster Size—Scalable (e.g., 1 RB), Cluster interval—Scalable (e.g., 10 RBs)
(2) Cluster Size—Scalable (e.g., 1 RB), Cluster interval—Fixed (e.g., 1.8 MHz)
(3) Cluster size—Fixed (e.g., 180 kHz), Cluster interval—Fixed (e.g., 1.8 MHz)

In this case, the term "Scalable" indicating that the cluster size (or cluster interval) is scalable may mean that the cluster size (or cluster interval) is determined by the number of resources (e.g., subcarriers) in the OFDM grid. In addition, the term "Fixed" indicating that the cluster size (or cluster interval) is fixed may mean that the cluster size is determined based on absolute values on the frequency axis (frequency domain).

In other words, if the cluster size or the cluster interval is scalable ("Scalable"), the cluster size is determined by the number of resources in the OFDM grid, such that the cluster size can be changed according to numerology.

In contrast, if the cluster size or the cluster interval is fixed ("Fixed"), the cluster size is determined based on absolute values on the frequency axis (frequency domain), such that the cluster size is not changed according to numerology.

In addition, the cluster may refer to a set (or aggregation) of consecutive frequency resources in the frequency axis (frequency domain). The cluster size may refer to the size of a frequency domain constructing the cluster (in the frequency domain), and the cluster interval may refer to the distance between contiguous clusters (in the frequency domain).

Considering that the cluster constructs granularity of resource allocation for PUSCH (or PUCCH) transmission and demodulation performance having a predetermined level or more should be guaranteed for each cluster, it may be desirable for the cluster size to be defined in units of RBs.

In other words, a basic unit for resource allocation for PUSCH (or PUCCH) transmission should be a cluster, each cluster should be demodulated to have performance having a predetermined level or more. Thus, it may be desirable that the cluster size be configured (or set) in units of RBs.

The cluster interval has been introduced to mainly overcome PSD limitations for each 1 MHz, and it may be desirable for the cluster interval to be defined based on absolute values in the frequency domain. In order to minimize interference of interlace resources having different OFDM numerologies, it may be desirable that the size of the cluster interval be fixed to only one size.

Figure 15:
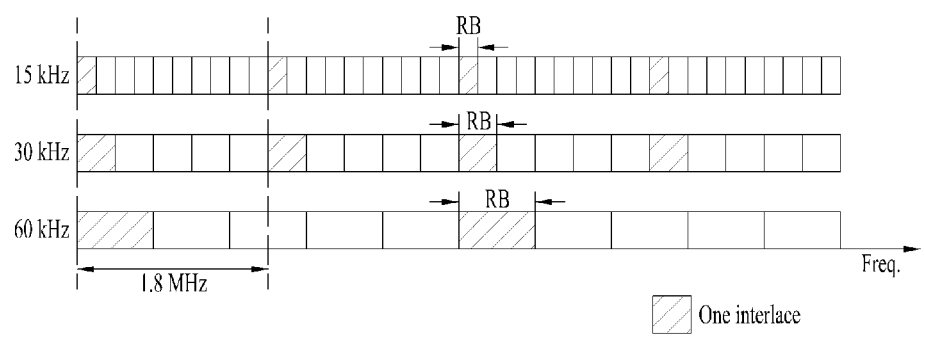
FIG. 15 is a diagram illustrating examples of a cluster size and a cluster interval based on OFDM numerology.

FIG. 15 is a conceptual diagram illustrating examples of the cluster size and the cluster interval based on OFDM numerology.

In FIG. 15, 15 kHz, 30 kHz, or 60 kHz may refer to the subcarrier spacing.

Referring to FIG. 15, at the subcarrier spacing of 15 kHz, an interlace structure for LTE eLAA may be adopted so that the cluster size of 1 RB (1RB cluster size) and the cluster interval (e.g., 10 RBs) of 1.8 MHz (1.8 MHz cluster interval) can be applied to the subcarrier spacing of 15 kHz.

At the subcarrier spacing of 30 kHz, the 1 RB cluster size and the 1.8 MHz cluster interval (e.g., 5 RBs) can be used.

In addition, at the subcarrier spacing of 60 kHz, the 1.8 MHz cluster interval may correspond to 2.5 RBs. Thus, as an exceptional example, the cluster size may be designed to be 0.5 RB. Alternatively, the cluster interval may be designed to be 3.6 MHz (e.g., 5 RBs) corresponding to a multiple of 1.8 MHz.

Alternatively, at the subcarrier spacing of 60 kHz, the 1.8 MHz cluster interval corresponds to 2.5 RBs, such that 3 RBs close to 2.5 RBs may exceptionally be used as the cluster interval.

The interlace structure shown in the above-mentioned paragraph 4.1 may be combined with other proposed methods of the present disclosure without being co-located with the other proposed methods, so that the resultant combined interlace structure and proposed methods can be simultaneously used.

4.2. Resource Allocation in Frequency Domain

4.2.1. First Method

In one embodiment of the present disclosure, one interlace resource in the frequency domain may be defined as a plurality of clusters, each of which has a constant cluster size and a constant cluster interval. In addition, when PRBs of multiple interlace resources are allocated to PUSCH (or PUCCH) transmission resources, frequency resources can be allocated using any one of the following four methods (1), (2), (3) and (4).

(1) First Method

In the first method, the entire transmission band is divided into a plurality of interlace resources, and consecutive interlace indexes can be allocated to an interlace index domain.

(2) Second Method

In the second method, VRB-to-PRB mapping for allocating consecutive RBs (or REs) to a VRB domain and then mapping the consecutive RBs (or REs) in the VRB domain to RBs (or REs) of interlace resources in the PRB domain may be used, so that resources can be allocated to the frequency domain using the VRB-to-PRB mapping method.
  The base station (BS) may decide whether to use VRB-to-PRB mapping through system information, higher layer signaling (e.g., RRC signaling), and/or DCI.
  Data mapping in PRBs corresponding to VRBs may be performed using a frequency-first mode. For example, data mapping in PRBs may be performed in the order of low PRB index→high PRB index.

(3) Third Method

In the third method, the entire transmission band is divided into a plurality of sub-bands, (consecutive) sub-band indexes are selected from among the sub-band index domain, and (consecutive) interlace indexes in the interlace index domain are allocated to the selected sub-bands.

For example, assuming that the entire transmission band is set to 80 MHz, the entire transmission band may be divided into four sub-bands in units of 20 MHz. Three sub-band indexes 0, 1, and 2 from among four sub-band indexes 0, 1, 2, and 3 can be selected in succession. In the selected sub-bands, consecutive interlace indexes may be allocated. In the sub-band index 3 indicating a non-selected sub-band, the interlace index may not be allocated.

Here, in another embodiment of the third method (3), after (discontinuous) sub-band indexes are selected from among the sub-band index domain using a bitmap method, a method for allocating (consecutive) interlace indexes in the interlace index domain to the selected sub-bands may also be used as necessary.

Alternatively, in another embodiment of the third method (3), after discontinuous sub-band indexes are selected from among the sub-band index domain using the bitmap method, a method for allocating discontinuous interlace indexes in the interlace index domain to the selected discontinuous sub-bands may also be used as necessary.

In another example, after consecutive sub-band indexes are selected from among the sub-band index domain, a method for allocating discontinuous interlace indexes to the selected consecutive sub-bands in the interlace index domain may also be used as necessary.

In this case, allocation of discontinuous interlace indexes can also be performed using the bitmap method.
  The size of each sub-band (frequency domain) may be identical or proportional to the cluster interval.
  For the third method (3), two RIV fields in DCI may be used.

(4) Fourth Method

In the fourth method, the entire transmission band is divided into a plurality of sub-bands, each band for each sub-band is divided into a plurality of interlace resources, and consecutive interlace indexes in the interlace index domain are allocated.

The size of each sub-band (frequency domain) may be identical to or proportional to the cluster interval.

For the fourth method (4), as many RIV fields as the number of sub-bands in DCI may be used as necessary.

In this case, a method for allocating consecutive resources (e.g., interlaces, RBs, or REs) may be implemented by a resource indication value (RIV) method in which the start point for resource allocation and the length for resource allocation are indicated by predetermined values.

If the UE transmits a PUCCH using less frequency resources than the allocated frequency resources, the actual available frequency resources can be selected using any one of the following methods 1) and 2).

1) The following steps can be repeated for available frequency resources.

Step 1: In Step 1, an interlace having an earlier index value can be selected with higher priority.

Step 2: In Step 2, a PRB having an earlier index value (in the interlace) can be selected with higher priority.

In this case, when only frequency resources corresponding to one interlace are used for PUCCH transmission, all PRBs can be used without excluding a specific PRB included in the interlace. That is, if one interlace is selected by Step 1, all PRBs belonging to the selected interface can be used, and Step 2 may not be carried out as needed.

In addition, when frequency resources corresponding to multiple interlaces are used for PUCCH transmission, some PRBs are excluded from a specific interlace by Step 1 and Step 2, and then PUCCH resources are used. That is, Step 2 may be carried out only in the case where multiple interlaces are selected.

2) (In case of using VRB-to-PRB mapping) VRB having a low index value may be selected with higher priority.

In LTE eLAA according to embodiments of the present disclosure, a method for allocating frequency resources in units of interlaces according to unlicensed band regulations that should occupy the system bandwidth of 80% or more has been defined. Similar to LTE eLAA, a method for allocating frequency resources in units of interlaces according to the frequency resource allocation method for PUSCH (or PUCCH) even in NR U-band may be considered and utilized.

However, according to recent unlicensed band regulations, assuming that the transmission band of the corresponding signal is set to 2 MHz or more without occupying the system bandwidth of 80%, temporary transmission of the corresponding signal may be allowed. Therefore, a method for supporting fine granularity about frequency-domain resource allocation may be considered in NR U-band as compared to LTE eLAA.

In particular, fine granularity may have advantages in that various TBSs are supported based on standalone operations of the NR U-band. In addition, when frequency resources are allocated in units of interlaces, it is possible to mitigate (or overcome) the shortcoming in that frequency granularity is determined based on the BWP size.

In one embodiment of the present disclosure, VRB-to-PRB mapping for allocating consecutive RBs (or REs) to the VRB domain and then mapping the consecutive RBs (or REs) in the VRB domain to RBs (or REs) of interlace resources in the PRB domain may be used, so that resources can be allocated to the frequency domain using the VRB-to-PRB mapping method.

For example, it is assumed that the interlace structure is configured in a manner that the entire transmission band is denoted by N RBs, the cluster size is denoted by 1 RB, and the cluster interval is denoted by L RBs. In addition, VRB-to-PRB mapping may be represented using a block interleaver shape in which the number of columns is denoted by ceil(N/L) or floor(N/L). The VRB index may be a value that is written in the block interleaver on a row-by-row basis, and the PRB index may be read on a column-by-column basis.

Figure 16:
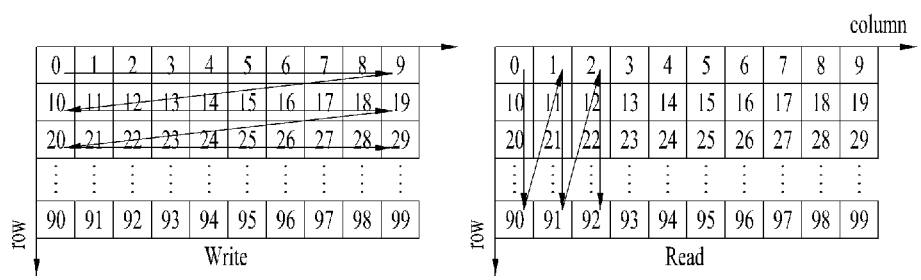
FIGS. 16 and 17 are conceptual diagrams illustrating examples of a VRB-to-PRB mapping method according to embodiments of the present disclosure.
Figure 17:
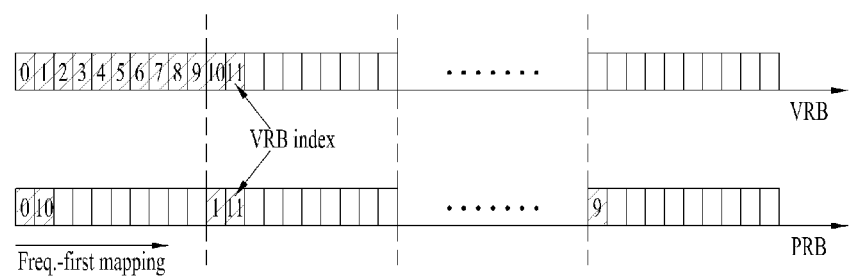

FIGS. 16 and 17 are conceptual diagrams illustrating examples of the VRB-to-PRB mapping method according to embodiments of the present disclosure.

As illustrated in FIGS. 16 and 17, the entire transmission band is denoted by 100 RBs, the cluster size is denoted by 1 RB, and the cluster interval is denoted by 10 RBs.

Table 6 illustrates VRB indexes and PRB indexes according to one embodiment of the present disclosure.

TABLE 6

| VRB index | 0 | 1 | 2 | ... | 9 | 10 | ... |
| PRB index | 0 | 10 | 20 | ... | 100 | 1 | ... |

Referring to FIG. 16, the left drawing of FIG. 16 shows a method for selecting a VRB index value. In detail, the left drawing of FIG. 16 may illustrate a method for writing the block interleaver on a row-by-row basis.

The right drawing of FIG. 16 shows a method for selecting a PRB index value corresponding to the VRB index. In detail, the right drawing of FIG. 16 may illustrate a method for reading the block interleaver on a column-by-column basis.

In FIG. 17, the selected VRB indexes and the PRB indexes corresponding to the selected VRB indexes are illustrated in the frequency domain.

In this case, the operation for allocating the actual data to PRBs corresponding to specific consecutive VRBs according to the VRB-to-PRB mapping method can be carried out according to the order of frequency domain resources. That is, actual data to be allocated to PRBs can be allocated according to the order of frequency domain resources. This is because, when the frequency domain orders of data are mixed in a situation in which data obtained by DFT spreading is divisionally transmitted in units of blocks (e.g., B-IFDM), low PAPR characteristics can be damaged.

Figure 18:
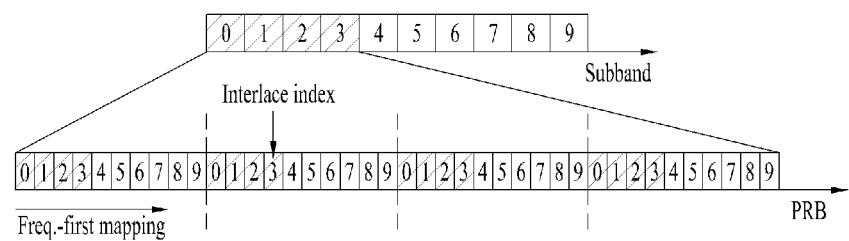
FIG. 18 is a conceptual diagram illustrating a method for allocating sub-bands and interlace resources according to embodiments of the present disclosure.

FIG. 18 is a conceptual diagram illustrating a method for allocating sub-bands and interlace resources according to embodiments of the present disclosure.

Referring to FIG. 18, according to one embodiment of the present disclosure, the entire transmission band is divided into a plurality of sub-bands, and consecutive sub-band indexes are selected from among the sub-band index domain, such that the consecutive interlace indexes in the interlace index domain can be allocated to the selected sub-bands.

For example, it is assumed that the entire transmission band is denoted by 100 RBs, the cluster size is denoted by 1 RB, and the cluster interval is denoted by 10 RBs. In this case, a total of 100 RBs can be classified into 10 sub-bands, each of which has a size of 10 RBs. In addition, consecutive sub-bands can be selected from among the 10 sub-bands by a field of RIV 1. Finally, consecutive interlace indexes in the interlace index domain can be allocated by a field of RIV 2 in the selected sub-bands.

According to the above-mentioned operation, the base station (BS) may allow the UE to perform data transmission in some of the entire band. Therefore, the system according to one embodiment of the present disclosure is beneficial to FDM communication between data segments having different BWP sizes.

The above-mentioned method shown in the above-mentioned paragraph 4.2.1 may be combined with other proposed methods of the present disclosure without being co-located with the other proposed methods, so that the combined method and proposed methods can be simultaneously used.

4.2.2. Second Method

In accordance with one embodiment of the present disclosure, one interlace resource in the frequency domain may be defined as a plurality of clusters, each of which has a constant cluster size and a constant cluster interval. When PRBs in the plurality of interlace resources are allocated to PUSCH (or PUCCH) transmission resources, the BS can additionally provide the following information about the bandwidth (BW).

(1) Reference BW for Interlace Configuration

A reference BW may refer to a reference bandwidth (BW) in which interlace resources are defined, and the reference BW may be commonly promised or configured in UEs.

In addition, information about the reference BW may be indicated by system information or higher layer signaling.

(2) UL BWP

UL BWP may refer to a bandwidth part (BWP) through which the UE performs actual UL transmission.

In addition, UL BWP information may be indicated by system information or higher layer signaling.

(3) Active Sub-band(s) or De-active (or inactive or deactivated) Sub-band(s)

Here, active sub-band(s) or de-active (inactive or deactivated) sub-band(s) may refer to sub-bands that can be used (or cannot be used) for actual data transmission in the reference BW or the UL BWP.

In addition, information about the Active Sub-bands or De-active (inactive or deactivated) Sub-bands (3) may be indicated by higher layer signaling and/or DCI.

In this case, the reference BW may include a UL BWP, and the UL BWP may include sub-band(s).

In addition, each sub-band may be identical in size to the bandwidth scheduled for LBT execution.

Here, the format of indicating sub-bands that can be used (or cannot be used) for actual data transmission may be implemented using the bitmap scheme.

In the NR system according to one embodiment of the present disclosure, UL BWP scheduled to perform actual UL transmission for each UE may be configured in different ways. In this case, when the interlace resource structure is defined for each UL BWP, it may be difficult to support multiplexing between UL transmission signals that are transferred from different UL BWPs.

In other words, the respective UEs may receive different UL BWPs. Therefore, when each of different UL BWPs is configured as an interlace resource structure, it may be difficult to perform multiplexing between signals transferred from different UL BWPs.

Therefore, the present disclosure provides a method for defining interlace resources for the reference BW that is commonly promised or configured in UEs, and a method for allowing actual UL transmission to be performed only within the UL BWP.

In addition, even in the UL BWP, in order to protect data transmission of other UEs having different UL BWPs, the present disclosure provides a method for informing a user of information about sub-bands (that can be used (or cannot be used) for actual UL transmission) using higher layer signaling and/or DCI.

That is, the respective UEs may configure interlace resources in a bandwidth commonly configured for such UEs. In addition, the UE may additionally receive information about the sub-bands that can be used for actual UL transmission.

The above-mentioned method shown in the above-mentioned paragraph 4.2.2 may be combined with other proposed methods of the present disclosure without being co-located with the other proposed methods, so that the combined method and proposed methods can be simultaneously used.

4.2.3 Third Method

In accordance with one embodiment of the present disclosure, one interlace resource in the frequency domain may be defined as a plurality of clusters, each of which has a constant cluster size and a constant cluster interval. In addition, at a specific time where (consecutive) PRBs (RA Type A) in the transmission band or PRBs (RA Type B) in interlace resources can be allocated to PUSCH (or PUCCH) transmission resources, the above-mentioned two RA types (RA Type A and RA Type B) can be indicated using any one of the following methods (1) and (2).

(1) RA type information may be (semi-statically) configured through system information or higher layer signaling (e.g., RRC signaling).

(2) RA type information may be (dynamically) indicated through higher layer signaling and/or DCI.

In the NR system according to one embodiment of the present disclosure, if waveforms of a PUSCH to be transmitted correspond to DFT-s-OFDM in NR, RA Type A for allocating some (consecutive) PRBs in the transmission band can be supported. RA type A may be advantageous over the interlace-based resource allocation method in terms of efficient UL resource utilization and coverage increment based on low PAPR characteristics. Therefore, in the region in which the regulations of occupying the unlicensed band of 80% or the PSD regulations are mitigated, it may be desirable that a method for supporting RA Type A instead of the interlace-based resource allocation method be used.

In general, information about whether consecutive PRBs will be allocated or PRBs in interlaces will be allocated may be dependent upon the regulation contents of the corresponding unlicensed band. Therefore, the RA type scheme may consider a method for (semi-statically) configuring (or setting) necessary information through system information (e.g., MIB, SIB, and RMSI), higher layer signals, or the like. However, in some cases, transmission (Tx) power may be set to a low power level, so that it may not be necessary to use the interlace structure. In addition, in some cases, transmission (Tx) power should be set to a high power level, so that it may be necessary to use the interlace structure. Therefore, information about whether the BS will use resource allocation of consecutive PRBs or will use resource allocation of PRBs belonging to interlaces may be dynamically configured through signals such as DCI or the like. For example, RA type information may be indicated through the RA Type indicator field included in DCI.

The above-mentioned method shown in the above-mentioned paragraph 4.2.3 may be combined with other proposed methods of the present disclosure without being co-located with the other proposed methods, so that the combined method and proposed methods can be simultaneously used.

4.2.4 Fourth Resource Allocation Method

In accordance with one embodiment of the present disclosure, one interlace resource in the frequency domain may be defined as a plurality of clusters, each of which has a constant cluster size and a constant cluster interval. In addition, when PRBs in multiple interlace resources are allocated to PUSCH (or PUCCH) transmission resources, frequency hopping can be performed in the same interlace resources.

In accordance with one embodiment of the present disclosure, the following frequency hopping methods (1) and (2) may be considered.

(1) Frequency hopping may be performed only for PRBs of the corresponding interlace in units of interlaces.

(2) (In case of using VRB-to-PRB mapping) Frequency hopping may be performed in a VRB domain.

In this case, the method for performing frequency hoping for PRBs belonging to the interlace may include a (frequency domain) mirroring method or a frequency hopping offset application method, etc.

In this case, the term "mirroring" may be a method for enabling hopped resources to be allocated to mirrored images of resources obtained before the hopped resources. That is, the mirroring method may be a method in which the order of resource allocation resources is inverted.

In addition, when frequency hopping for PUSCH (or PUCCH) transmission resources allocated to consecutive frequency resources are used, a frequency hopping interval (or a frequency hopping offset) can be restricted to be valid only when a frequency hopping interval (or a frequency hopping offset) is set to a predetermined band or more (e.g., 2 MHz or more).

In the NR system according to one embodiment, the frequency hopping operation can be supported to obtain a frequency diversity gain during PUSCH (or PUCCH) transmission. In NR U-band, if PUSCH (or PUCCH) resources are allocated to some PRBs belonging to the interlace, the frequency hopping operation may still be valid.

However, unlike general frequency hopping, it may be desirable that two frequency hops (e.g., a first hop ($1^{st}$ hop) and a second hop ($2^{nd}$ hop)) according to frequency hopping be present in the same interlace resources, such that presence of such two frequency hops should be additionally considered. As a result, increase in interlace resources occupied by PUSCH (or PUCCH), according to the frequency hopping operation from the viewpoint of resource allocation, is prevented. In one example, a method for performing frequency hopping about PRBs contained in the corresponding interlace or performing frequency hopping about the VRB domain (during VRB-to-PRB mapping) may be considered.

Figure 19:
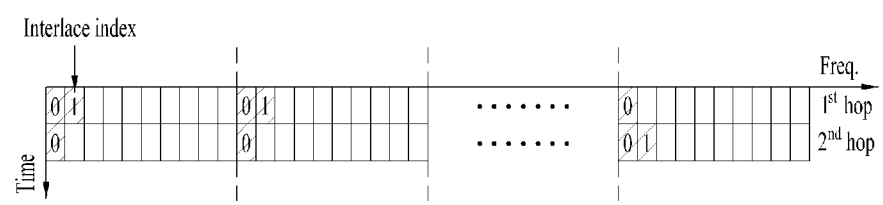
FIG. 19 is a conceptual diagram illustrating an example of frequency hopping used in interlaces according to embodiments of the present disclosure.

FIG. 19 is a conceptual diagram illustrating an example of frequency hopping applied to the interlace according to embodiments of the present disclosure.

Referring to FIG. 19, it is assumed that all PRBs (in the interlace) are allocated to Interlace Index 0 and only some PRBs (in the interlace) are allocated to Interlace Index 1.

FIG. 19 is a conceptual diagram illustrating that frequency hopping belonging to the corresponding interlace is applied to PRBs allocated to Interlace Index 1.

The above-mentioned method shown in the above-mentioned paragraph 4.2.4 may be combined with other proposed methods of the present disclosure without being co-located with the other proposed methods, so that the combined method and proposed methods can be simultaneously used.

4.2.5. Fifth Method

In accordance with one embodiment of the present disclosure, a minimum number of PRBs needed for PUSCH (or PUCCH) transmission may be set to any one of the following parameters.

(1) X PRB (for example, X=2)

(2) A minimum number of PRBs satisfying Y MHz or more (e.g., Y=2)

In this case, the parameter 'X' may be a predetermined value or a value configured through higher layer signaling. In addition, the value of X may be configured in different ways according to OFDM numerologies applied to PUSCH (or PUCCH).

In recent unlicensed band regulations, if the transmission band of the corresponding signal is set to 2 MHz or more without occupying the system bandwidth of 80%, temporary transmission of the corresponding signal may be allowed when the transmission band of the corresponding signal is set to 2 MHz or more. Here, 2 MHz may be a minimum bandwidth that should be satisfied in PUSCH (or PUCCH) transmission. Therefore, as an example of a method for satisfying such regulations, at least 2 PRBs may always be allocated for PUSCH (or PUCCH) transmission, and the band for transmitting 2 PRBs may be set to 2 MHz or more. In this case, 2 PRBs may be two PRBs belonging to a specific interlace.

In another example, when consecutive PRBs (in the frequency domain) are allocated to transmission resources of PUSCH or (PUCCH), a minimum number of PRBs may be defined in a manner that the band occupied by consecutive PRBs is set to 2 MHz or more according to the applied OFDM numerology. For example, if SCS (subcarrier spacing) is set to 15 kHz, 1 PRB is set to 0.18 MHz so that 1 PRB is unable to satisfy the condition of 2 MHz, such that at least 12 PRBs (or at least 6 PRBs) can be allocated.

The above-mentioned method shown in the above-mentioned paragraph 4.2.5 may be combined with other proposed methods of the present disclosure without being co-located with the other proposed methods, so that the combined method and proposed methods can be simultaneously used.

Figure 20:
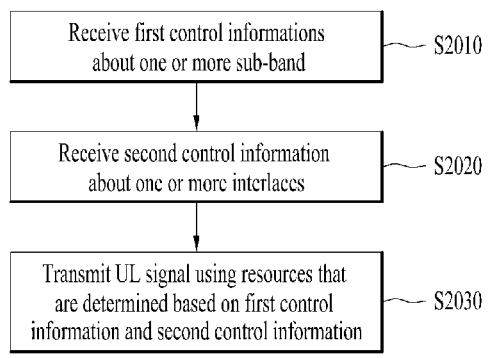
FIG. 20 is a flowchart illustrating operations of a user equipment (UE) according to embodiments of the present disclosure.

FIG. 20 is a flowchart illustrating operations of the user equipment (UE) according to embodiments of the present disclosure.

Referring to FIG. 20, the UE may receive first control information from the BS in the unlicensed band in step S2010 (S2010). In this case, the first control information may include information about at least one sub-band from among the entire transmission band configured for the UE in the unlicensed band.

The entire transmission band may include a plurality of interlaces. Each interlace may include a plurality of resource blocks (RBs), each of which has a predefined interval in the entire transmission band.

The UE may receive second control information from the BS in step S2020 (S2020). In this case, the second control information may include information about at least one interlace from among the plurality of interlaces.

In addition, according to a channel access procedure from the UE to the BS, the UE may transmit the UL signals through resources that are determined based on the first control information and the second control information in step S2030 (S2030).

In this case, each of the sub-bands may be configured to have the same size as a basic unit size for the channel access procedure.

In addition, resources determined based on the first control information and the second control information may include the at least one interface in the at least one sub-band.

The entire transmission band may be indicated through system information or higher layer signaling.

The first control information may be received through higher layer signaling or downlink control information (DCI).

The first control information may include a first resource indication value (RIV) indicating a start point and a length of the at least one sub-band.

The first control information may include bitmap information indicating the at least one sub-band.

The second control information may be received through downlink control information (DCI).

In addition, the second control information may include a second RIV indicating a start point and a length of the at least one interlace.

The second control information may include bitmap information indicating the at least one interlace.

When each of the plurality of RBs includes 12 subcarriers and the 12 subcarriers are spaced apart from each other at intervals of 15 kHz, the predefined interval may be set to 10 RBs.

In addition, when each of the plurality of RBs includes 12 subcarriers and the subcarriers are spaced apart from each other at intervals of 30 kHz, the predefined interval may be set to 5 RBs.

When each of the plurality of RBs includes 12 subcarriers and the subcarriers are arranged at intervals of 60 kHz, the predefined interval may be set to 2.5 RBs, 3 RBs, or 5 RBs.

Figure 21:
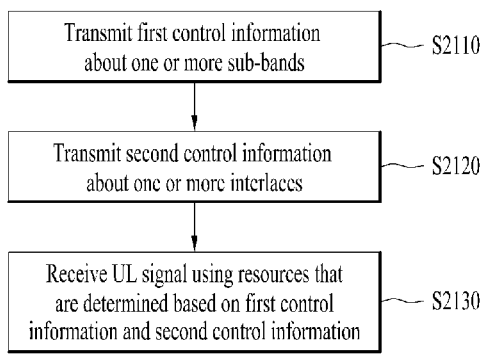
FIG. 21 is a flowchart illustrating operations of a base station (BS) according to embodiments of the present disclosure.

FIG. 21 is a flowchart illustrating operations of the base station (BS) according to embodiments of the present disclosure.

Referring to FIG. 21, the BS may transmit first control information to the UE in the unlicensed band in step S2110 (S2110). In this case, the first control information may include information about at least one sub-band from among the entire transmission band configured for the UE in the unlicensed band.

In addition, the entire transmission band may include a plurality of interlaces. Each interlace may include a plurality of resource blocks (RBs) arranged to have a predefined interval in the entire transmission band.

The BS may transmit second control information to the UE in step S2120 (S2120). In this case, the second control information may include information about at least one interlace from among the plurality of interlaces.

In addition, the BS may receive the uplink (UL) signals through resources that are determined based on the first control information and the second control information in step S2130 (S2130).

In the present disclosure, all of embodiments and examples described above (especially described above in FIGS. 20 and 21) can be combined or coupled to each other in so far as they can be compatible with one another. In other words, the UE and the BS according to the present disclosure can be combined or coupled to each other so that the UE and the BS can perform the combined/coupled operations in so far as the above-mentioned examples (especially described above in FIGS. 20 and 21) can be compatible with each other.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

Industrial Applicability

The embodiments of the present disclosure are applicable to various wireless access systems. Examples of the various wireless access systems include 3GPP (3rd Generation Partnership Project) system, 3GPP2 system, and the like. The embodiments of the present are applicable to all technical fields having the various wireless access systems applied thereto as well as to various wireless access systems. Further, the proposed method is applicable to mmWave communication systems configured to use a super-high frequency band.

What is claimed is:

1. A method for transmitting an uplink signal by a user equipment (UE) in a wireless communication system, the method comprising:
    receiving uplink resource information via radio resource control (RRC) signaling;
    determining whether a frequency domain resource allocation type for the uplink signal is a first type or a second type based on the uplink resource information; and
    transmitting the uplink signal based on the determined frequency domain resource allocation type,
    wherein, based on the determined frequency domain resource allocation type being the first type, the uplink signal is transmitted on continuous resource blocks, and
    wherein, based on the determined frequency domain resource allocation type being the second type, the uplink signal is transmitted on interlaced resource blocks and the interlaced resource blocks are determined based on two resource indication values (RIVs) included in downlink control information (DCI).

2. The method according to claim 1, wherein the uplink resource information is common information for a plurality of UEs in a cell.

3. The method according to claim 1, wherein the interlaced resource blocks are defined as a plurality of clusters having a predetermined cluster size and a predetermined cluster interval.

4. A user equipment (UE) configured to operate in a wireless communication system, the UE comprising:
a transceiver; and
a processor operably connect to the transceiver, the processor being configured to execute instructions to perform operations comprising:
receiving uplink resource information via radio resource control (RRC) signaling;
determining whether a frequency domain resource allocation type for an uplink signal is a first type or a second type based on the uplink resource information; and
transmitting the uplink signal based on the determined frequency domain resource allocation type;
wherein, based on the determined frequency domain resource allocation type being the first type, the uplink signal is transmitted on continuous resource blocks,
wherein, based on the determined frequency domain resource allocation type being the second type, the uplink signal is transmitted on interlaced resource blocks and the interlaced resource blocks are determined based on two resource indication values (RIVs) included in downlink control information (DCI).

5. The UE according to claim 4, wherein the uplink resource information is common information for a plurality of UEs in a cell.

6. The UE according to claim 4, wherein the interlaced resource blocks are defined as a plurality of clusters having a predetermined cluster size and a predetermined cluster interval.

7. A method for receiving an uplink signal by a network in a wireless communication system, the method comprising:
transmitting, to a user equipment (UE), uplink resource information via radio resource control (RRC) signaling,
wherein the uplink resource information informs the UE whether a frequency domain resource allocation type for the uplink signal is a first type or a second type; and
receiving, from the UE, the uplink signal based on the frequency domain resource allocation type,
wherein the uplink resource information informs the UE to transmit the uplink signal on continuous resource blocks based on the frequency domain resource allocation type being the first type,
wherein the uplink resource information informs the UE to transmit the uplink signal on interlaced resource blocks based on the frequency domain resource allocation type being the second type, and
wherein, based on the frequency domain resource allocation type being the second type, the interlaced resource blocks are determined based on two resource indication values (RIVs) included in downlink control information (DCI).

8. The method according to claim 7, wherein the uplink resource information is common information for a plurality of UEs in a cell.

9. The method according to claim 7, wherein the interlaced resource blocks are defined as a plurality of clusters having a predetermined cluster size and a predetermined cluster interval.

10. A network configured to operate in a wireless communication system, the network comprising:
a transceiver; and
a processor operably connect to the transceiver, the processor being configured to execute instructions to perform operations comprising:
transmitting, to a user equipment (UE), uplink resource information via radio resource control (RRC) signaling,
wherein the uplink resource information informs the UE whether a frequency domain resource allocation type for an uplink signal is a first type or a second type; and
receiving, from the UE, the uplink signal based on the frequency domain resource allocation type,
wherein the uplink resource information informs the UE to transmit the uplink signal on continuous resource blocks based on the frequency domain resource allocation type being the first type,
wherein the uplink resource information informs the UE to transmit the uplink signal on interlaced resource blocks based on the frequency domain resource allocation type being the second type, and
wherein, based on the frequency domain resource allocation type being the second type, the interlaced resource blocks are determined based on two resource indication values (RIVs) included in downlink control information (DCI).

11. The network according to claim 10, wherein the uplink resource information is common information for a plurality of UEs in a cell.

12. The network according to claim 10, wherein the interlaced resource blocks are defined as a plurality of clusters having a predetermined cluster size and a predetermined cluster interval.

13. A method according to claim 1, wherein a first RIV among the two RIVs is used for an interlace index and a second RIV among the two RIVs is used for a sub-band index, wherein the sub-band index corresponds to a sub-band as a resource block (RB) set including multiple RBs.

14. A UE according to claim 4, wherein a first RIV among the two RIVs is used for an interlace index and a second RIV among the two RIVs is used for a sub-band index, wherein the sub-band index corresponds to a sub-band as a resource block (RB) set including multiple RBs.

15. A method according to claim 7, wherein a first RIV among the two RIVs is used for an interlace index and a second RIV among the two RIVs is used for a sub-band index, wherein the sub-band index corresponds to a sub-band as a resource block (RB) set including multiple RBs.

16. A network according to claim 10, wherein a first RIV among the two RIVs is used for an interlace index and a second RIV among the two RIVs is used for a sub-band index, wherein the sub-band index corresponds to a sub-band as a resource block (RB) set including multiple RBs.

* * * * *